United States Patent [19]

Ueda et al.

[11] Patent Number: 5,150,146
[45] Date of Patent: Sep. 22, 1992

[54] FOCUS DETECTING DEVICE UTILIZING AUXILIARY ILLUMINATION

[75] Inventors: Hiroshi Ueda; Toru Matsui; Noriyuki Okisu, all of Osaka, Japan

[73] Assignee: Minolta Camera Kabushiki Kaisha, Osaka, Japan

[21] Appl. No.: 610,333

[22] Filed: Nov. 5, 1990

Related U.S. Application Data

[63] Continuation of Ser. No. 351,854, May 15, 1989, abandoned.

[30] Foreign Application Priority Data

| May 16, 1988 | [JP] | Japan | 63-118632 |
| May 16, 1988 | [JP] | Japan | 63-118791 |
| May 17, 1988 | [JP] | Japan | 63-119681 |
| Oct. 25, 1988 | [JP] | Japan | 63-268783 |
| Oct. 25, 1988 | [JP] | Japan | 63-268784 |

[51] Int. Cl.⁵ .................................. G03B 13/36
[52] U.S. Cl. ................................ 354/403
[58] Field of Search .............. 354/403; 250/201.4

[56] References Cited

U.S. PATENT DOCUMENTS

| 4,065,778 | 12/1977 | Harvey | 354/403 |
| 4,410,261 | 10/1983 | Masunaga et al. | 354/403 X |
| 4,536,072 | 8/1985 | Taniguchi et al. | 354/403 |
| 4,602,861 | 7/1986 | Taniguchi et al. | 354/400 |
| 4,642,451 | 2/1987 | Tsunekawa et al. | 250/201 |
| 4,693,582 | 9/1987 | Kawamura et al. | 354/403 |
| 4,740,806 | 4/1988 | Takehana | 354/403 |
| 4,764,786 | 8/1988 | Tamura et al. | 354/403 |
| 4,843,415 | 6/1989 | Matsui et al. | 354/403 |

FOREIGN PATENT DOCUMENTS

| 59-104614 | 6/1984 | Japan . |
| 61-167931 | 7/1986 | Japan . |
| 62-215248 | 9/1987 | Japan . |

*Primary Examiner*—W. B. Perkey
*Attorney, Agent, or Firm*—Burns, Doane, Swecker & Mathis

[57] ABSTRACT

A focus detecting device for a camera utilizing auxiliary illumination, comprises a sensor for detecting the image of a photographic object, a first light emitter for projecting a first auxiliary light toward the object, a second light emitter for projecting a second auxiliary light toward the object. The second auxiliary light illuminates a smaller area than the first auxiliary light. The first and second light emitters are selectively driven in response to brightness of the object, thereby to produce a contrasty light image onto the object.

17 Claims, 32 Drawing Sheets

FIG·2

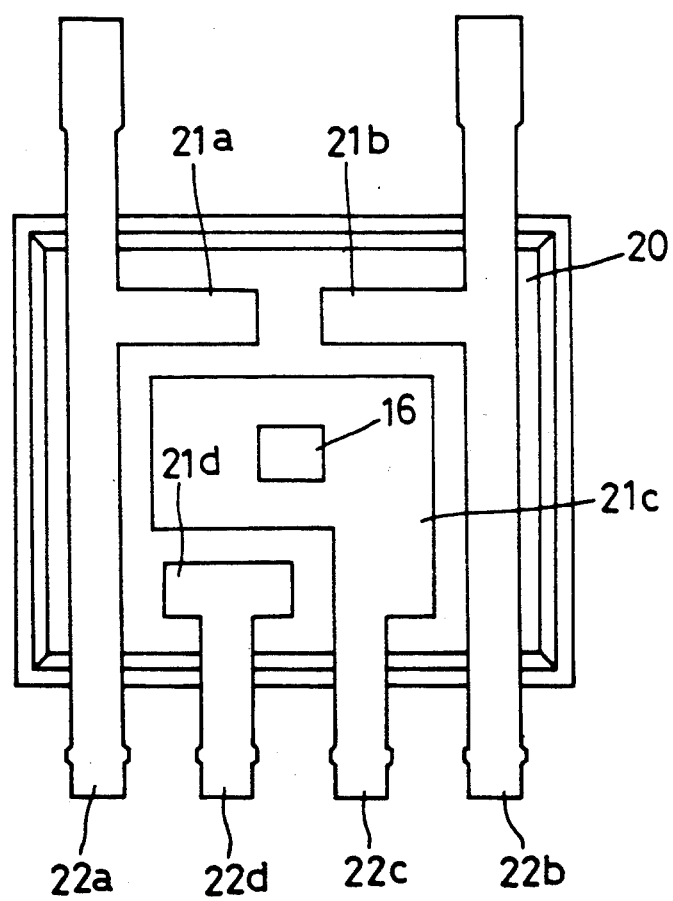
FIG·11

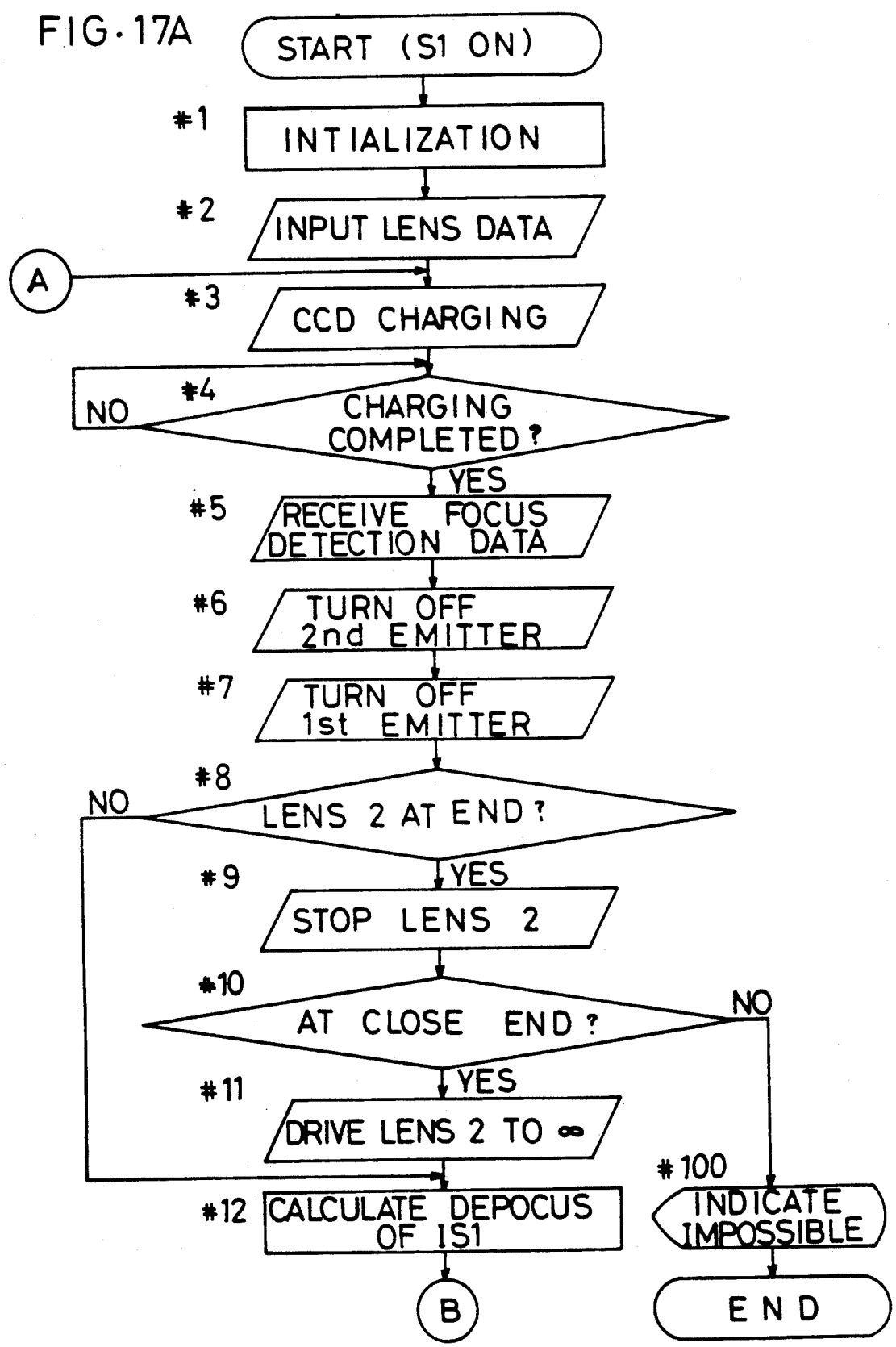

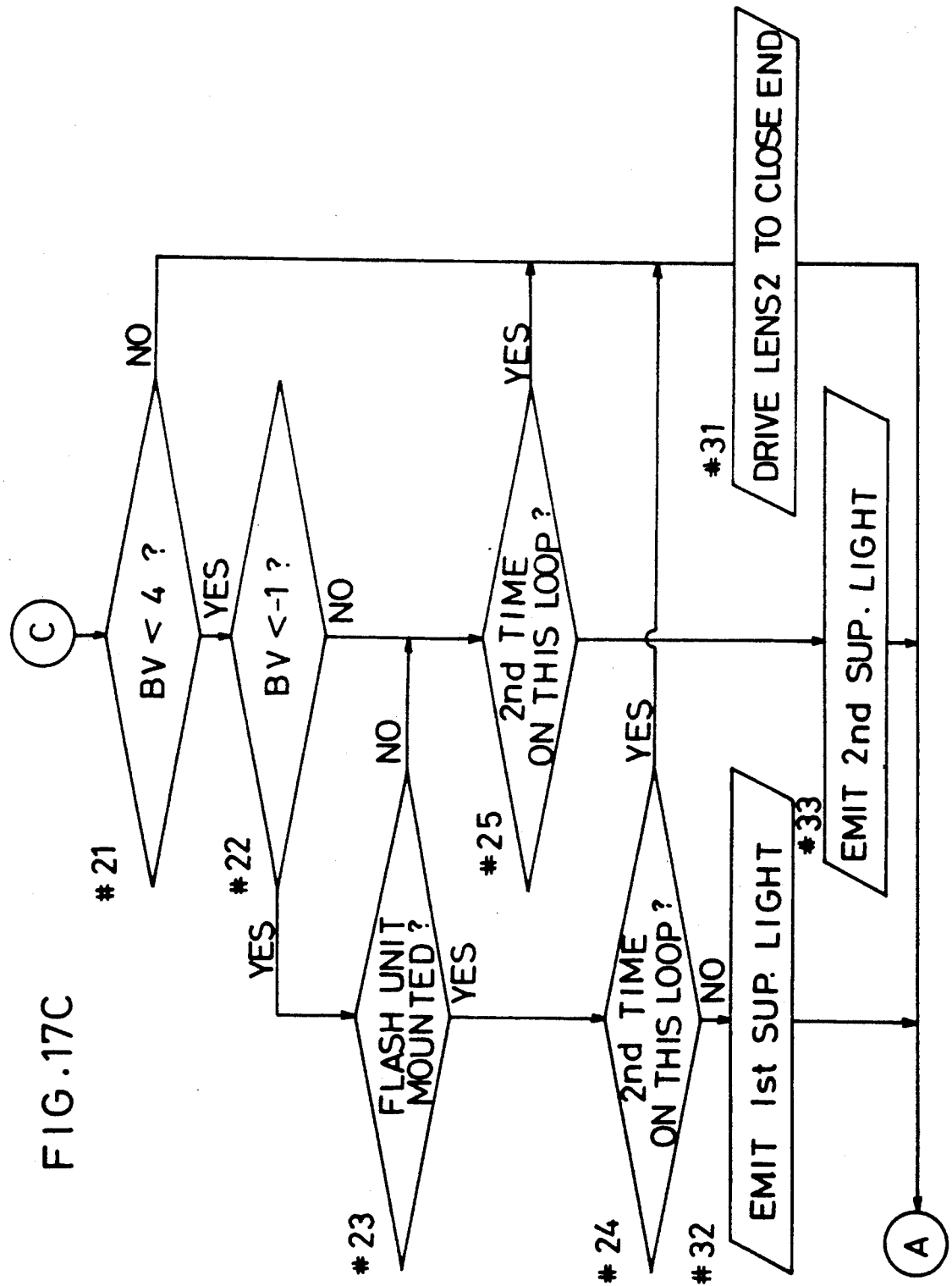

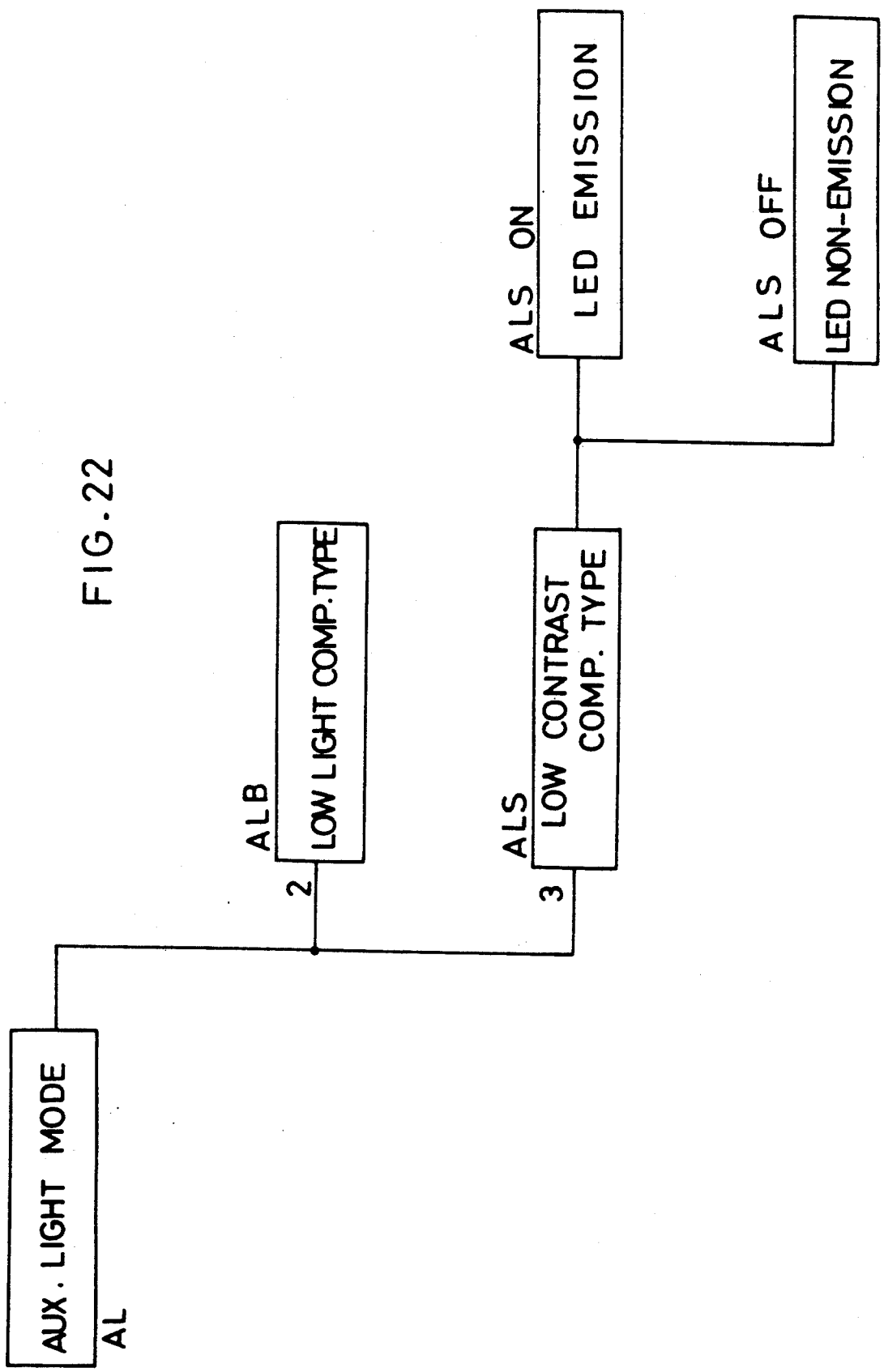

FOCUS DETECTING DEVICE UTILIZING AUXILIARY ILLUMINATION

This application is a continuation of application Ser. No. 07/351,854, filed May 15, 1989, now abandoned.

BACKGROUND OF THE INVENTION

The present invention relates to a focus detecting device of a photographic camera for detecting focusing conditions of an objective lens with respect to a photographic object, and more particularly to a focus detecting device including a device for projecting auxiliary light onto a low brightness object in aid of a focus detecting operation.

A typical example of such focus detecting systems is incorporated into a single lens reflex camera as a phase difference type focus detecting device. This system comprises a focus detecting optical system and a light measuring device. The focus detecting optical system splits a light reflected by a photographic object through the objective lens into two light bundles for impingement respectively upon two arrays of light receiving elements disposed in a position corresponding to a film plane. The light measuring device derives a deviation of the objective lens from an in-focus position with respect to the object from a phase difference between respective output signals of the arrays of light receiving elements.

Thus, the focus detecting device of the phase difference detection type relies for focus detection on the interrelation of the two output signals derived from the phase difference therebetween. Unless the photographic object has a certain degree of contrast, the interrelation of the signals will lose reliability or significance, thereby impairing a reliable focus detection. Moreover, when the brightness of the object is below a certain level, the object has an insufficient contrast for enabling the focus detection. In such a case, an auxiliary light projecting device is operated to project an auxiliary light beam onto the object to produce a sufficient contrast thereon.

Conventionally, the auxiliary light projecting device comprises a single optical system including a light emitting diode or the like to act as a light source for projecting a contrasty light image such as a striped pattern onto the object. The projecting region of this image, generally, is fixed to a region corresponding to a focus detecting area from which the focus detecting device receives the light beam. This enables the focus detecting device to carry out a focus detection as aided by the contrasty light image projected onto the object regardless of the position of the object.

The focus detecting device further comprises a control device operable in response to detected luminance of the object. This control device renders the auxiliary light projecting device inoperative when the luminance of the object is above a predetermined level for enabling the focus detection without the auxiliary light. When the brightness of the object is insufficient for enabling accurate focus detection under the ambient light condition, the control device causes the auxiliary light projecting device to project the auxiliary light onto the object.

The known focus detecting device of a camera, however, has the following disadvantage.

With the focus detecting device of the phase difference detection type, as noted above, an accurate focus detecting operation cannot be expected unless the photographic object has a certain degree of contrast. The object lacks in contrast not only when the luminance thereof is below a certain level but when the object itself, though its luminance may be sufficient, intrinsically has no contrast such as a monochromatic wall or the like.

According to the known focus detecting device, however, the auxiliary light projecting device is actuated to project auxiliary light only when the luminance of the object is at such a low level that an accurate focus detection is difficult or impossible under the ambient light condition. Although the focus detection is carried out as aided by the auxiliary light when the luminance of the object is at a low level, no focus detection is possible with the known system in the absence of contrast because of the nature or shape of the object itself even when the object has a high luminance level.

SUMMARY OF THE INVENTION

Having regard to the state of the art as noted above, a primary object of the present invention is to provide a focus detecting device capable of accurate focus detection even in various unfavorable conditions.

This object is fulfilled, according to the present invention, by a focus detecting device utilizing auxiliary illumination light, comprising focus detecting means for detecting a focusing condition with respect to an object by utilizing an image of the object; first auxiliary light projecting means for projecting a first auxiliary light toward said object; second auxiliary light projecting means for projecting a second auxiliary light toward the object, the second auxiliary light being different in characteristics from the first auxiliary light; and selecting means for selecting between the first auxiliary light projecting means and the second auxiliary light projecting means in response to a state of the object.

This focus detecting device is capable of employing the phase difference detection method, for example, by producing a contrasty light image on the object even if the object lacks in contrast because of the nature of the object itself. When the luminance of the object is above a predetermined level, however, a sufficient contrast cannot be produced on the object for enabling the focus detection by projecting the light beams having such brightness as to enable the focus detection with respect to the object below the predetermined luminance level, because of the ambient brightness. According to the present invention, the first auxiliary light projecting means is provided for projecting a first auxiliary light beam in aid of a focus detecting operation, as in the prior art, when the luminance of the object is below the predetermined level. Further, the second auxiliary light projecting means is provided for projecting a second auxiliary light beam different in characteristics from the first auxiliary light beam. The first and second auxiliary light projecting means are selectively operable for enabling focus detection with respect to various objects.

In a preferred embodiment of the invention, the selecting means selects between the first auxiliary light projecting means and the second auxiliary light projecting means in response to luminance of the object. The second auxiliary light projecting means may illuminate a smaller region than the first auxiliary light projecting means.

According to this system, an image having a clear contrast is projected onto the object when the luminance of the object is above the predetermined level, thereby enabling the focus detection with respect to such an object.

The second auxiliary light projecting means projects an intense auxiliary light beam which is produced by condensing the first auxiliary light beam or a light beam equivalent thereto. Thus the first and second auxiliary light projecting means may have an identical construction not only where the two auxiliary light projecting means share the same light source but where the auxiliary light means have separate light sources. As a result, the auxiliary light means have the same power consumption, and the light beam may be condensed to have an increased intensity without increasing the power consumption for enabling the focus detection over a wide range.

The focus detecting device according to the focus detecting device may be incorporated into a camera having a lens drive system. It will be convenient in this case if the first auxiliary light projecting means has a different power source, and the second auxiliary light projecting means shares a power source with the lens drive system, the first and second auxiliary light projecting means being selectively operable to project the auxiliary light beams. More particularly, control means is provided which, when the first auxiliary light projecting means is selected, prohibits light emission from the first auxiliary light projecting means during a lens movement and, when the second auxiliary light projecting means is selected, allows light emission from the second auxiliary light projecting means even during the lens movement. This control means assures an optimal use of the auxiliary light as associated with the lens drive.

The focus detecting device according to the present invention provides not only an auxiliary light for enhancing focus detecting reliability with respect to an object at a low luminance level but an auxiliary light of greater intensity for aiding the focus detection without increasing power consumption. Consequently, a highly reliable focus detection may be carried out with respect to a highly luminous object lacking in contrast, let alone an object at a low luminance level as in the prior art. This is achieved by producing an image having a sharp contrast on the highly luminous object for enabling a reliable focus detection, which was impossible with the known focus detecting device. The present invention thus provides an economical focus detecting device capable of accurate focus detection over an increased range of conditions.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 1 through 17 show a focus detecting device according to the present invention, in which:

FIG. 1 is a schematic view illustrating optical paths,
FIG. 2 is a perspective view of a camera,
FIG. 3 is a schematic perspective view of a focus detecting optical system and adjacent components,
FIG. 4 is a schematic illustration of a field view in a finder,
FIG. 5 is a schematic perspective view of a first light emitter,
FIG. 6 is a cross section of the first light emitter,
FIG. 8 is a schematic perspective view of a second light emitter,
FIG. 9 is a front view of an LED pellet of the second light emitter,
FIG. 10 is a section taken on line X—X of FIG. 9,
FIG. 11 is a front view of a substrate of the LED pellet of the second light emitter,
FIG. 12 is a graph illustrating emission intensities of the second light emitter,
FIG. 13 is an exploded perspective view of the second light emitter,
FIG. 14 is an enlarged sectional view of an adjusting screw of the second light emitter,
FIG. 15 is a circuit diagram of the camera,
FIG. 16 is a diagram of an LED drive circuit,
and
FIGS. 17A, 17B and 17C are flow charts illustrating a focus detecting operation.

FIGS. 18 through 24 show another embodiment relating to auxiliary light emission, in which:

FIG. 18 is a schematic perspective view of an auxiliary illumination source and an optical system therefor,
FIG. 19 is a schematic view illustrating optical paths,
FIG. 20 is a circuit diagram of a focus detecting device,
FIG. 21 is a view showing details of a focus detecting sensor,
FIG. 22 is a block diagram of an auxiliary light mode,
FIG. 24 is a flow chart illustrating CCD integrating operations.

FIGS. 25 through 29 show a further embodiment, in which:

FIG. 25 is a schematic view of patterns of light projected from light emitting diodes,
FIG. 26 is a circuit diagram of the camera,
FIGS. 27 and 28 are time charts illustrating a focus detecting operation.

FIGS. 30 and 31 show a still further embodiment, in which:

FIG. 30 is a sectional view corresponding to FIG. 10, and
FIG. 31 is a front view corresponding to FIG. 9.

DESCRIPTION OF THE PREFERRED EMBODIMENTS

Embodiments of the present invention will be described hereinafter with reference to the drawings.

Figure 1:
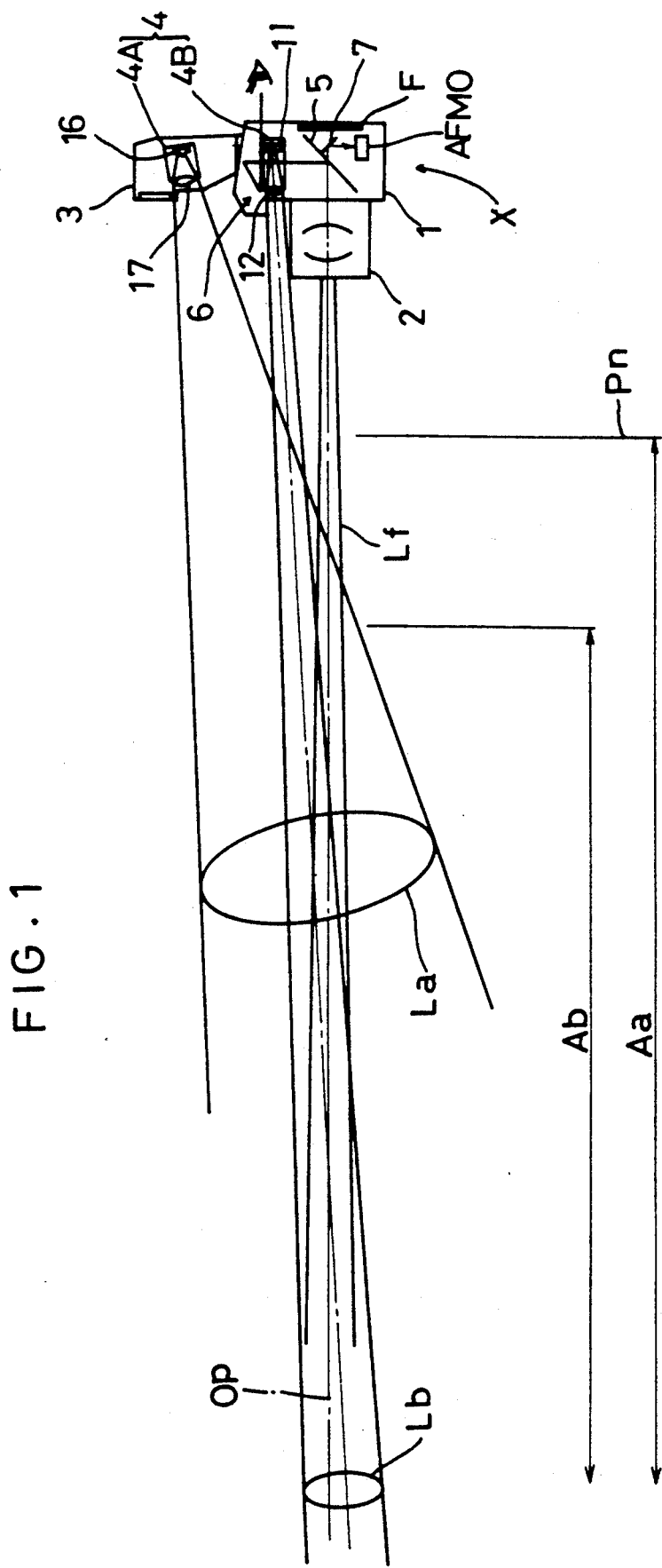
Figure 2:
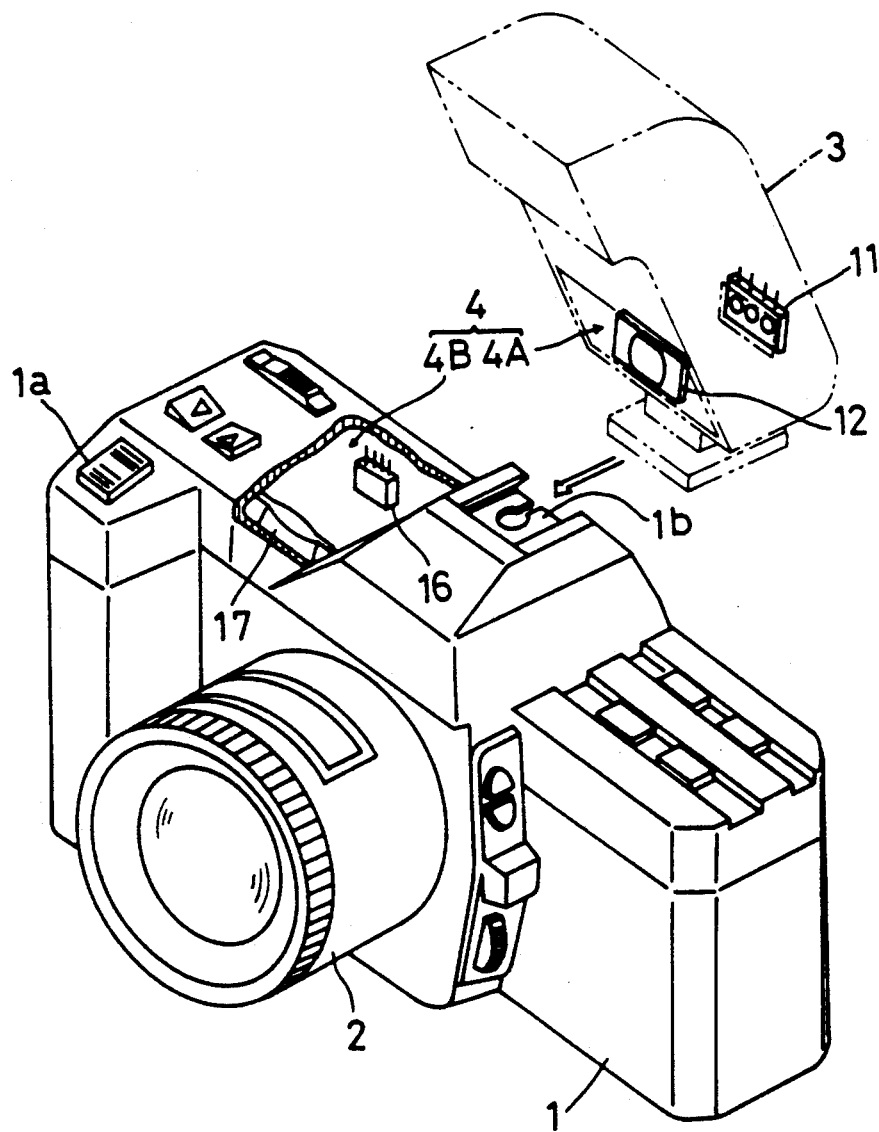

FIG. 2 is a schematic view of an entire camera having a focus detecting device X shown in FIG. 1 according to the present invention. This camera comprises a camera body 1, an objective lens 2 detachably attached to the camera body 1, and a flash unit 3 detachably attached to a hot shoe 1b of the camera body 1.

The focus detecting device X has a principal portion thereof disposed inside the camera body 1. As will be described in detail later, the focus detecting device X carries out focus detection by utilizing light beams incoming from photographic object through the lens 2 to determine a deviation of a movable lens portion of the lens 2 from an in-focus position with respect to the photographic object. Further, a focusing device is mounted in the camera body 1, which is operable in response to the deviation detected by the focus detecting device X for moving the movable lens portion to the in-focus position.

The focus detecting device X employs a phase difference detecting method and, as is well known, requires the photographic object to have a certain degree of contrast in order to realize high-precision focus detection. Because a photographic object in a dark place has a low contrast, in order to detect such an object with equally high precision, the focus detecting device X comprises an auxiliary light emitting device 4 for emitting auxiliary light beams to project contrasty light images onto the object.

The auxiliary light emitting device 4 includes a first light emitter 4A mounted in the flash unit 3 and a second light emitter 4B mounted in the camera body 1. These light emitters 4A and 4B have separate auxiliary light sources 11 and 16, and separate projecting lenses 12 and 17. The first light emitter 4A projects a first auxiliary light beam to an incident light beam region of a focus detecting optical system AO of the focus detecting device X. This optical system AO will be described later. The second light emitter 4B projects a second auxiliary light beam to a region smaller than the projecting region of the first auxiliary light beam by condensing an auxiliary light beam equivalent to the first auxiliary light beam. Details of the two auxiliary light emitters 4A and 4B will be described later.

The projecting regions of the two auxiliary light beams will be described further with reference to FIG. 1.

As shown, the first auxiliary light beam La is projected from the first light emitter 4A to a relatively large region. The projecting region of the first auxiliary light beam La overlaps the incident light beam region Lf provided by the focus detecting optical system AO in a photographic distance range Aa beyond a closeup limit point Pn of the objective lens 2. Thus, the focus detecting device X observes a contrasty image formed by the first auxiliary light beam La on a photographic object at any position throughout a whole photographic distance range along an optical axis Op extending from the objective lens 2. The second auxiliary light beam Lb projected from the second light emitter 4B is condensed to a region smaller than the projecting region of the first auxiliary light beam La and overlapping the incident light beam region Lf in a photographic distance range referenced Ab in FIG. 1. The second auxiliary light beam Lb is thus more intense than the first auxiliary light beam La, and forms an image producing sharp contrasts on a photographic object in the range Ab. By observing this image, the focus detecting device X carries out accurate focus detection even where the image formed by projecting the first auxiliary light beam La has a low contrast due to a high luminance level of the object.

In FIG. 1, reference numeral 5 denotes a main mirror for splitting a light beam from a photographic object to proceed toward a film F and toward a finder optical system 6. Reference numeral 7 denotes a sub mirror for directing to the focus detecting device X the light beam having passed through the main mirror 5 and proceeding toward the film F.

Next, a construction surrounding the focus detecting optical system AO will be described with reference to FIG. 3.

References TL1 and TL2 denote lens components of the objective lens 2, which are located at distances PZ1 and PZ2 (PZ1 being less than PZ2) from a plane equivalent to an intended image-forming plane or film plane FP, respectively. A field mask FM is disposed adjacent the intended image-forming plane FP. The field mask FM defines a sideways elongated first rectangular opening EO centrally thereof, and a second and a third rectangular openings EO1 and EO2 which are vertically elongated and disposed at opposite sides. Light beams traveling from photographic objects through the rectangular openings EO, EO1 and EO2 of the field mask FM pass through condenser lenses LO, LO1 and LO2 to be condensed, respectively. These condenser lenses LO, LO1 and LO2 are hereinafter referred to as the first to third condenser lenses LO, LO1 and LO2 corresponding to the rectangular openings EO, EO1 and EO2 of the field mask FM.

Rearwardly of the condenser lenses LO, LO1 and LO2 are an aperture mask AM and a re-imaging lens plate L. The re-imaging lens plate L includes a sideways arranged re-imaging lens pair L1 and L2 centrally thereof, and vertically arranged re-imaging lens pairs L3–L6 at opposite sides. These lenses L1–L6 comprise convex lenses having the same radius of curvature, and each defining one flat surface. The central re-imaging lens pair L1 and L2 is hereinafter referred to as the first re-imaging lens pair L1 and L2, the lateral re-imaging lens pair L3 and L4 as the second re-imaging lens pair L3 and L4, and the lateral re-imaging lens pair L5 and L6 as the third re-imaging lens pair L5 and L6 corresponding to the rectangular openings EO, EO1 and EO2 of the field mask FM.

The aperture mask AM defines field stops A1–A6 at positions opposed to the re-imaging lenses L1–L6. This aperture mask AM is disposed immediately forwardly of the re-imaging lens plate L and in tight contact with the flat surface of the re-imaging lens plate L.

Rearwardly of the re-imaging lens plate L is a circuit board P including three CCD line sensors PO, PO1 and PO2. The line sensor PO at the center is sideways elongated, while the line sensors PO1 and PO2 disposed laterally are vertically elongated. Thus these CCD line sensors PO, PO1 and PO2 extend in a way to correspond to the directions in which the re-imaging lens pairs L1–L6 are arranged on the re-imaging lens plate L, respectively. Each of the CCD line sensors PO, PO1 and PO2 includes two, a first and a second arrays of light-receiving elements for separately effecting photoelectric conversion on two images of a photographic object re-formed by each re-imaging lens pair on each CCD line sensor. The CCD line sensors PO, PO1 and PO2 are hereinafter referred to as the first to third CCD line sensors PO, PO1 and PO2 corresponding to the rectangular openings EO, EO1 and EO2 of the field mask FM.

Figure 3:
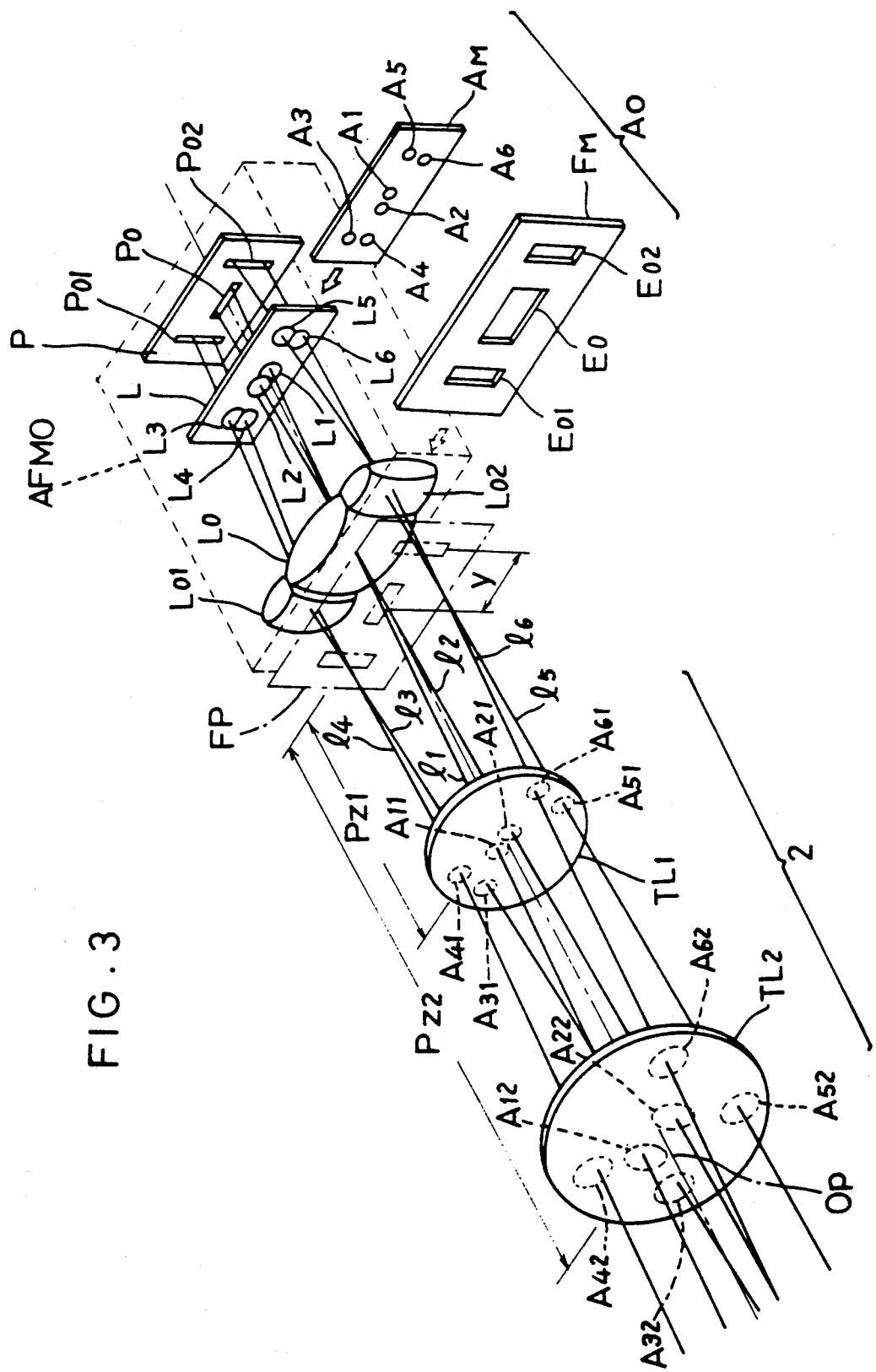

The components in a block AFMO bounded by dotted lines in FIG. 3 are integrated into an AF (autofocus) sensor module. The field mask FM, condenser lenses LO, LO1 and LO2, aperture mask AM and re-imaging lens plate L constitute the focus detecting optical system AO.

The focus detecting optical system AO as constructed above provides the images of photographic objects for use by the focus detecting device X, and the latter detects focusing positions as follows.

A range-finding light beam including main rays of light 13 and 14 and traveling from an object in a region off the optical axis Op of the objective lens 2 reaches the field mask FM in a manner to deviate from the optical axis Op at a certain angle thereto. This off-axial light beam passes through the second rectangular opening EO1 of the field mask FM and impinges upon the second condenser lens LO1. The second condenser lens LO1 condenses the off-axis light beam and refracts it toward the optical axis Op. Thereafter the off-axis light beam travels through the second stop apertures A3 and A4 of the aperture mask AM to the second re-imaging lens pair L3 and L4 of the re-imaging lens plate L. The range-finding, off-axis light beam incident on the second re-imaging lens pair L3 and L4 is then condensed onto the second CCD line sensor PO1 and re-forms a vertical pair of object images on the second CCD line sensor PO1 for use in the focus detection.

Similarly, a range-finding, off-axis light beam including main rays of light 15 and 16 reaches the field mask FM in a manner to deviate from the optical axis Op at a certain angle thereto. This light beam passes through the third rectangular opening EO2 of the field mask FM, the third condenser lens LO2, the third stop apertures A5 and A6 of the aperture mask AM and the third re-imaging lens pair L5 and L6 to be condensed onto the third CCD line sensor PO2. This light beam re-forms a vertical pair of object images on the third CCD line sensor PO2 for use in the focus detection.

On the other hand, a range-finding light beam including main rays of light 11 and 12 and traveling from an object in a region including the optical axis Op of the objective lens 2 passes through the first rectangular opening EO of the field mask FM on the optical axis Op, the first condenser lens LO, the first stop apertures A1 and A2 of the aperture mask AM on the optical axis Op, and the first re-imaging lens pair L1 and L2 to be condensed onto the first CCD line sensor PO. This light beam re-forms a sideways pair of object images on the first CCD line sensor PO for use in the focus detection.

Focusing positions of the objective lens 2 with respect to the photographic objects are detected by determining positions of the object images constituting the three pairs of images produced on the CCD line sensors PO, PO1 and PO2.

Figure 4:
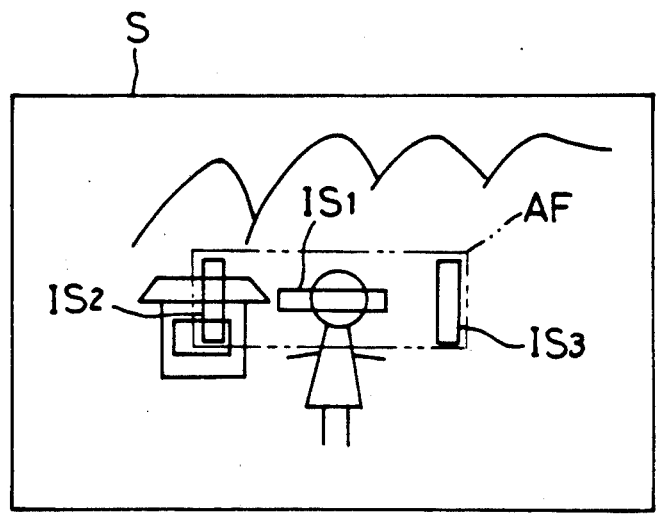

The above construction will be described further in relation to a field view in a viewfinder as shown in FIG. 4. The first CCD line sensor PO corresponds to an on-axis focus detecting region IS1, the second CCD line sensor PO1 to a lefthand off-axis focus detecting region IS2, and the third CCD line sensor PO2 to a righthand off-axis focus detecting region IS3. Focus detection may be carried out with respect to photographic objects in the three focus detecting regions IS1–IS3 located centrally of a screen S, which regions are indicated in solid lines. These regions are hereinafter referred to as the first to third islands IS1, IS2 and IS3 where distinction thereof is necessary. FIG. 4 includes a rectangular frame AF in a dot and dash line, which indicates to the photographer a region for which the focus detection is carried out.

Specific constructions of the first and second light emitters 4A and 4B mentioned hereinbefore will be described next.

Figure 5:
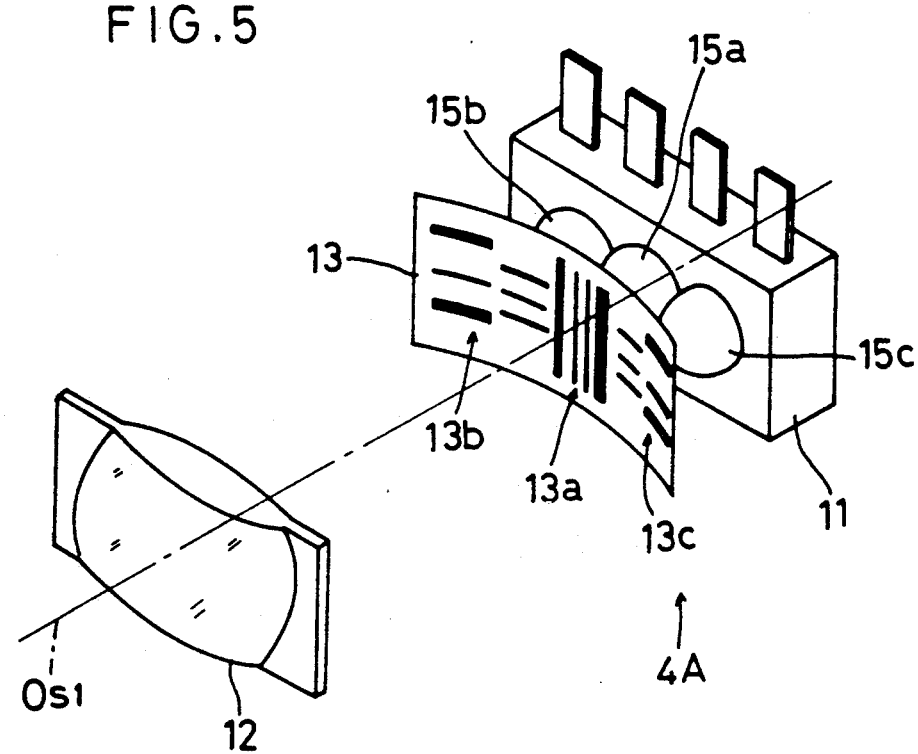
Figure 6:
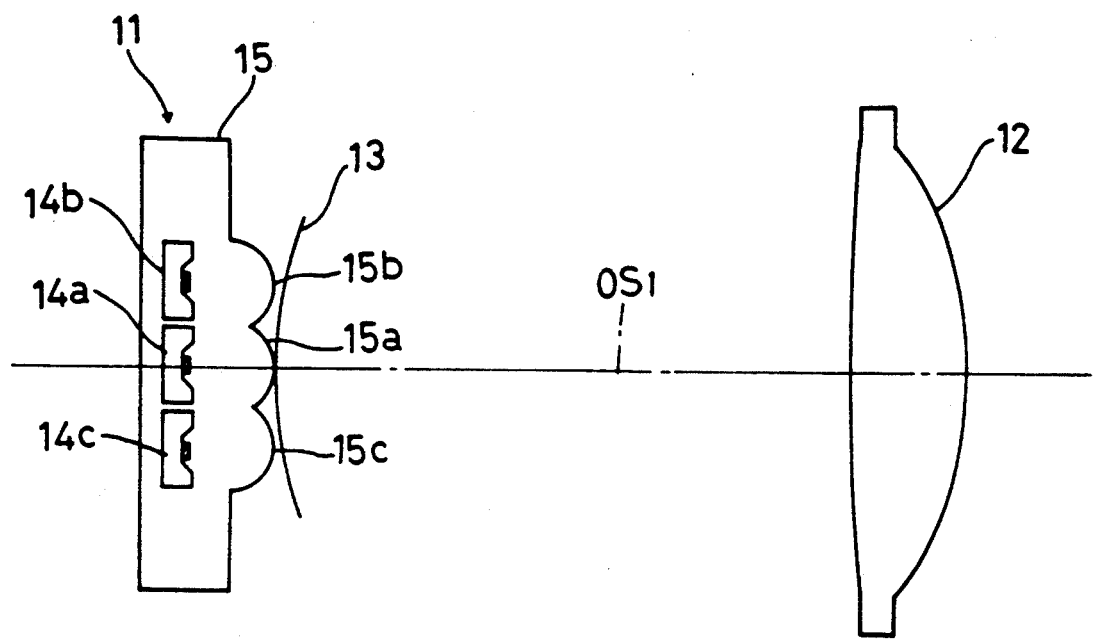

As shown in FIGS. 5 and 6, the first light emitter 4A includes an LED unit 11 acting as the auxiliary light source, a projecting lens 12, and a projection pattern film 13 disposed in between.

The LED unit 11 includes three LED pellets 14a–14c arranged horizontally in an optical plastic (an acrylic, epoxy or other resin) 15. The optical plastic 15 defines spherical lenses 15a–15c on an output side thereof which correspond to the three LED pellets 14a–14c, respectively.

As shown in FIG. 5, the projection pattern film 13 defines projection patterns 13a–13c corresponding to the three LED pellets 14a–14c. The central pattern 13a comprises a random arrangement of vertical stripes, while the lateral patterns 13b and 13c each comprise a random arrangement of horizontal stripes. The three LED pellets 14a–14c project images of the three projection patterns 13a–13c onto the photographic objects as depicted in FIGS. 7A and 7B.

It has been noted with reference to FIG. 1 that the projecting region in side view of the first auxiliary light beam La projected from the first light emitter 4A corresponds to the incident light beam region of the focus detecting optical system AO in the photographic range extending along the optical axis Op of the objective lens 2. In addition, the projecting region in plan view of the first auxiliary light beam La embraces the entrance pupil even when the projecting range of the entrance pupil is varied horizontally such as when focal length f of the objective lens 2 is varied.

Figure 7A:
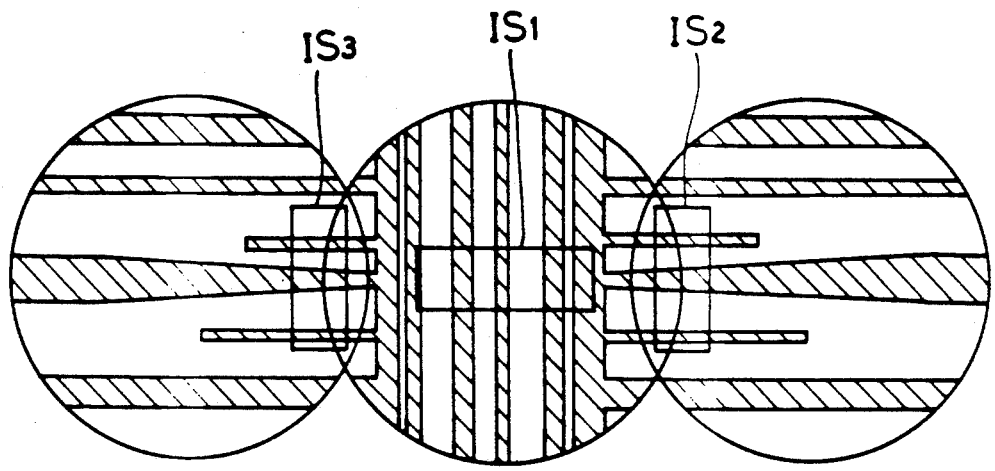
FIGS. 7A and 7B are schematic views illustrating relations between a projection pattern and focus detecting regions, respectively.
Figure 7B:
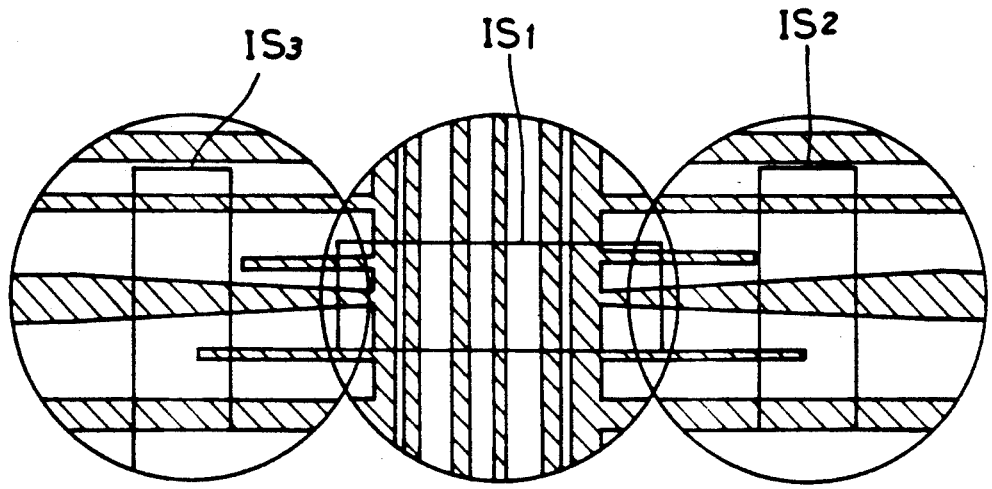

This feature is illustrated in FIGS. 7A and 7B. FIG. 7A shows the case where the focal length f of the objective lens 2 is 50 mm, while FIG. 7B shows the case where the focal length f is 28 mm. It will be seen that, in either case, the projecting region of the first auxiliary light beam La embraces the entrance pupil of the focus detecting optical system AO according to this embodiment which comprises a combination of the three focus detecting regions IS1–IS3 noted hereinbefore.

Regardless of the type of objective lens 2, the first island IS1 always overlaps the image of the central projection pattern 13a while the lateral, second and third islands IS2 and IS3 always overlap the images of the right and left projection patterns 13b and 13c, respectively. In each of the focus detecting regions IS1–IS3 the image of the stripes arranged longitudinally of the region is utilized as a contrasty image for assisting in the focus detection.

As shown in FIG. 6, the projection pattern film 13 is curved to become progressively remote, as it extends away from a projecting optical axis Os1 of the first light emitter 4A, from the LED pellets 14a–14c arranged in a direction perpendicular to the optical axis Os1. This construction prevents the projection pattern 13b or 13c remote from the projecting optical axis Os1 from being projected as a blurred image onto the photographic object due to the aberration of the single projecting lens 12.

Figure 8:
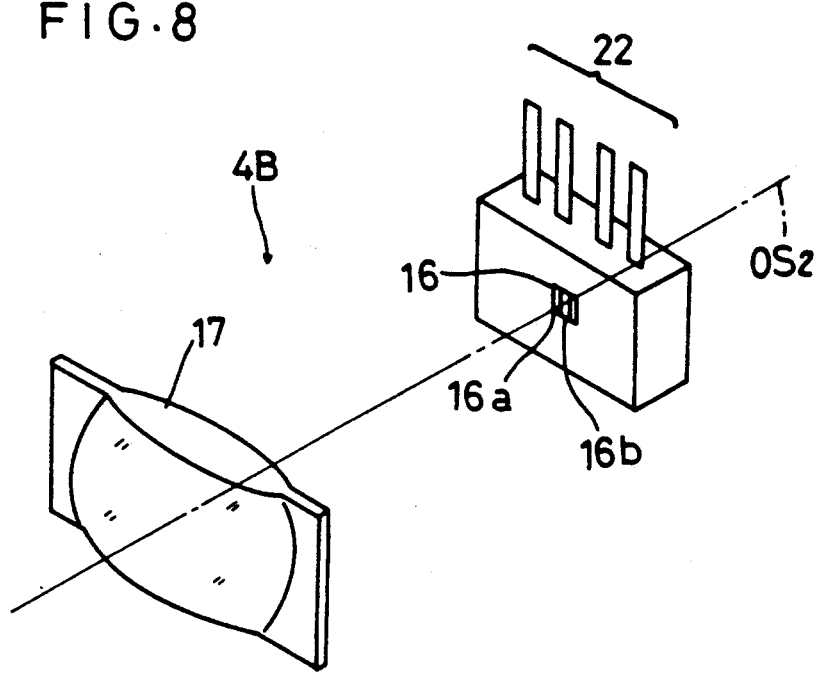

Referring to FIG. 8, the second light emitter 4B includes an LED pellet 16 and a projecting lens 17. The LED pellet 16 includes a light emitting portion 16a to which a projection pattern 16b is directly attached.

Figure 9:
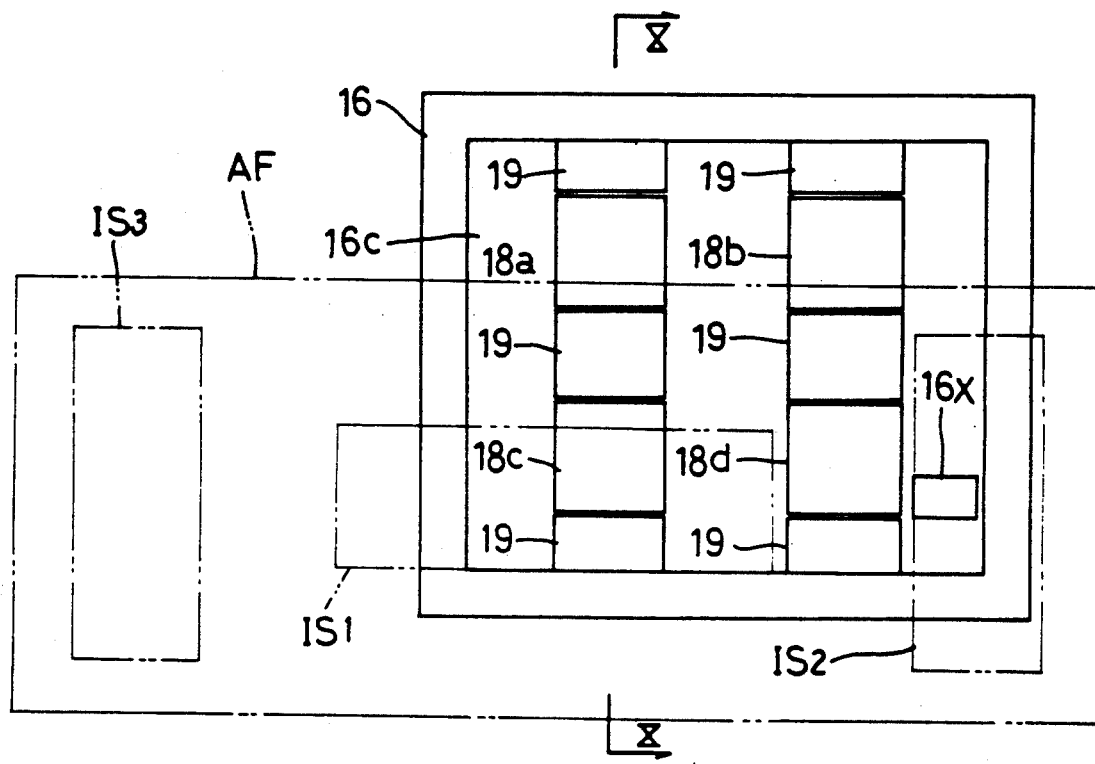

The projection pattern 16b comprises a random arrangement of vertical stripes. The light emitting portion 16a projects the image of the projection pattern 16b onto the photographic objects so as to overlap the first island IS1 in the middle, as shown in FIG. 9, in the region Ab where the second auxiliary light beam Lb mentioned earlier overlaps the projecting region Lf of the entrance pupil.

Figure 10:
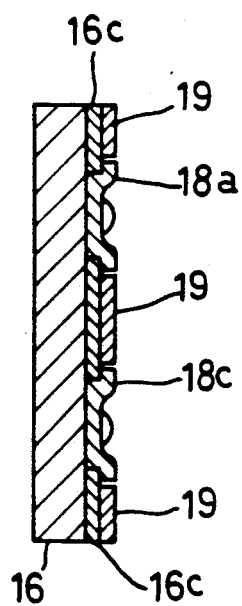

Referring to FIG. 10, the LED pellet 16 further includes a layer of silicon dioxide 16c formed thereon by vapor deposition. On the silicon layer 16c are formed, by vapor deposition, opaque electrodes 18 for supplying electric currents to the LED pellet 16, and opaque metal layers 19, to constitute in combination the striped projection pattern 16b as shown in FIG. 9. The electrodes 18 are disposed at four, upper and lower, right and left positions as in FIG. 9 which is a front view of the LED pellet 16. Each of the metal layers 19 is interposed between a vertical pair of electrodes 18a and 18c or 18b and 18d, or between each electrode and a top or bottom frame.

As shown in FIG. 11, the LED pellet 16 includes a substrate 20 supporting a common electrode 21c which is common to the four electrodes 18, electrodes 21a and 21b associated with the upper electrodes 18a and 18b, respectively, and an electrode 21d common to the lower electrodes 18c and 18d. These electrodes 21a-21b have respective terminals 22a-22d extending from the substrate 20.

Emission intensity of the LED pellet 16 is vertically variable by controlling voltages applied to the electrodes 18a-18d of the LED pellet 16 through the electrodes 21a and 21d on the substrate 20.

Figure 12:
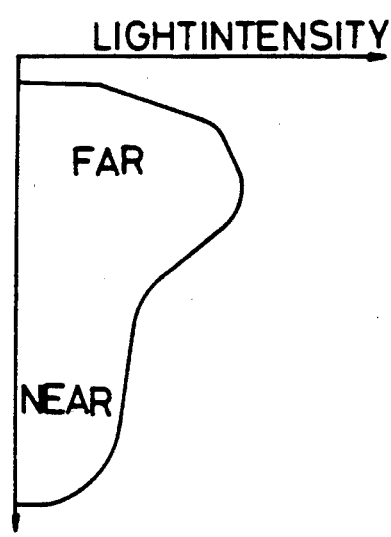

As shown in FIG. 10, the electrodes 18a and 18c or 18b and 18d (reference is made hereinafter only to the electrodes 18a and 18c on one side) for applying voltages to the LED pellet 16 are spaced apart to minimize interference therebetween. Varied currents may be caused to flow from the electrodes 18a and 18c into the LED pellet 16 in accordance with the voltages applied to these electrodes 18a and 18c, thereby to partially vary the emission intensity. Specifically, in front view of the LED pellet 16 as shown in FIG. 9, a greater voltage may be applied to the upper electrodes 18a and 18b than to the lower electrodes 18c and 18d. As a result, the emission intensity of the LED pellet 16 becomes greater in the upper position than in the lower position as illustrated in FIG. 12.

This feature will be described in relation to the fact that the light emitted from the LED pellet 16 is used as the second auxiliary light beam Lb for assisting in the focus detection. As seen in FIG. 1, there is a parallax between the optical axis Op and a projecting optical axis Os2 of the second light emitter 4B. Thus, the image of an upper part of the projection pattern 16b is projected onto a remote object, while the image of a lower part of the projection pattern 16b is projected onto an object close to the camera. The second auxiliary light beam Lb, therefore, projects the image of the projection pattern 16b clearly onto the remote object by increasing the intensity of the upper part over that of the lower part. When projecting the image of the projection pattern 16b onto the object close to the camera, the light intensity may be lowered to a level just necessary for the purpose, thereby to reduce power consumption.

The second light emitter 4B is intended for projecting the second auxiliary light beam Lb as an aid for the focus detection particularly under a high luminance condition onto photographic objects having a low contrast. The second auxiliary light beam Lb is projected to a smaller region than the first auxiliary light beam La as noted hereinbefore, in order to project a light more intense than the first auxiliary light beam La without increasing power consumption. Consequently, the image of the projection pattern 16b projected onto the photographic objects sometimes does not overlap the focus detecting regions IS1-IS3 even in the photographic distance range covered by the objective lens 2. In order that the focus detection may be carried out by projecting the second auxiliary light beam Lb onto photographic objects in such a range, the second light emitter 4B is constructed to project the second auxiliary light beam Lb in directions varied vertically and horizontally. A construction for enabling the variations in the projecting direction will be described next.

Figure 13:
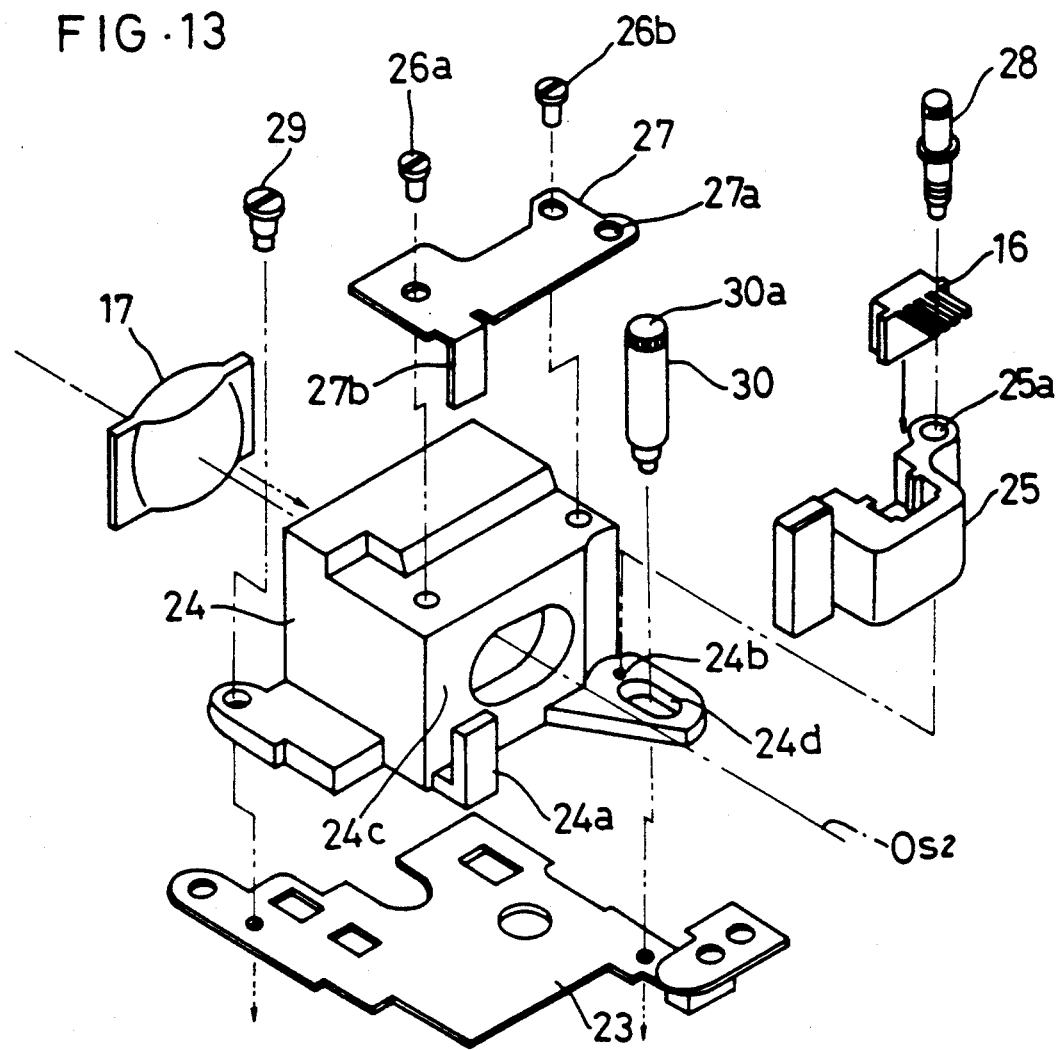
Figure 14:
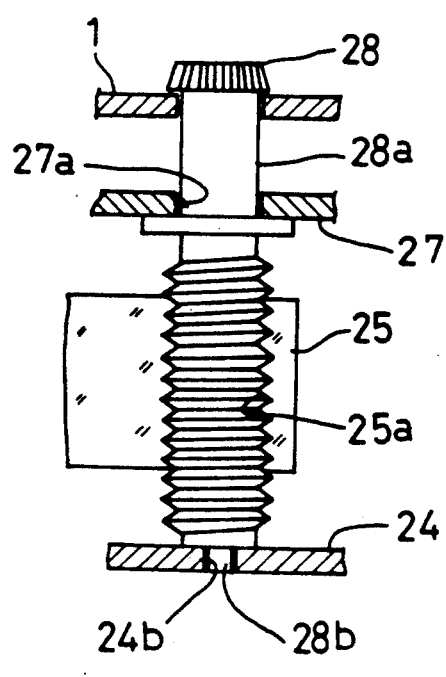

As shown in FIG. 13, the second light emitter 4B is supported by a holder 24 mounted on a base plate 23 fixed to the camera body not shown. The projecting lens 17 is fitted in and secured to the holder 24. The LED pellet 16 is supported by an LED holder 25 attached to the holder 24. The LED holder 25 is retained in position in the direction parallel to the projecting optical axis Os2 by a bent portion 27b of a stationary plate 27 fixed by a pair of fixing screws 26a and 26b to an upper surface of the holder 24, a projection 24a continuous with the holder 24, and a rear surface 24c of the holder 24. As also shown in FIG. 14, the LED holder 25 is retained in position in the vertical direction by an adjusting screw 28 meshed with a female screw 25a defined in the LED holder 25. The adjusting screw 28 includes a head 28a rotatably fitted in a through bore 27a defined in the stationary plate 27, and an extreme end 28b rotatably fitted in a through bore 24b defined in the holder 24.

According to the above construction, the LED pellet 16 is vertically adjustable together with the LED holder 25 by turning the adjusting screw 28, thereby to vertically vary the projecting direction of the second auxiliary light beam Lb. More particularly, as shown in FIG. 14, the LED holder 25 has the female screw 25a meshed with the adjusting screw 28 which is held against vertical movement by the stationary plate 27 and holder 24. Besides, the LED holder 25 is held in position in the direction parallel to the projecting optical axis Os2 as noted above. The LED holder 25 is thus vertically adjustable with turning of the adjusting screw 28.

Further, the holder 24 is attached to the base plate 23 through a fixed screw 29 having a forward end thereof calked to the base plate 23, and through an eccentric screw 30. The eccentric screw 30 includes a head 30a fitted in a through bore 24c defined in the holder 24. By turning the eccentric screw 30 which causes the head 30a to press upon an inside wall of the through bore 24c, the LED pellet is pivotable together with the holder 24 about the fixed screw 29, thereby to horizontally vary the projecting direction of the second auxiliary light beam Lb.

The head 28a of adjusting screw 28 and the head 30a of eccentric screw 30 extend upward to project outwardly of an upper surface of the camera body 1 for allowing the variations in the projecting direction of the second auxiliary light beam Lb to be effected manually. Those portions of the two screws 28 and 30 projecting outwardly of the camera body 1 are peripherally knurled to aid in gripping.

A variation in the projecting direction of the second auxiliary light beam Lb is followed by an operation for checking whether or not the image of the projection pattern 16b projected onto the photographic objects is located in the three focus detecting regions IS1-IS3, namely whether the focus detection is possible or not.

Returning to FIG. 9, the focus detection is found possible after an adjustment or variation in the horizontal direction when a vertical contrast of the projection pattern 16b is detected in the first island IS1. For the purpose of the checking operation following a vertical adjustment, the projection pattern 16b includes a dummy pattern 16x consisting of a metal layer for providing a horizontal contrast at upper and lower ends.

The focus detection is found possible after a vertical adjustment when the horizontal contrast of the dummy pattern 16x is detected in the second island IS2.

An operation of the camera having the focus detecting device X as described above will be described next. First, an outline of a control circuitry of this camera will be described with reference to FIG. 15.

Figure 15:
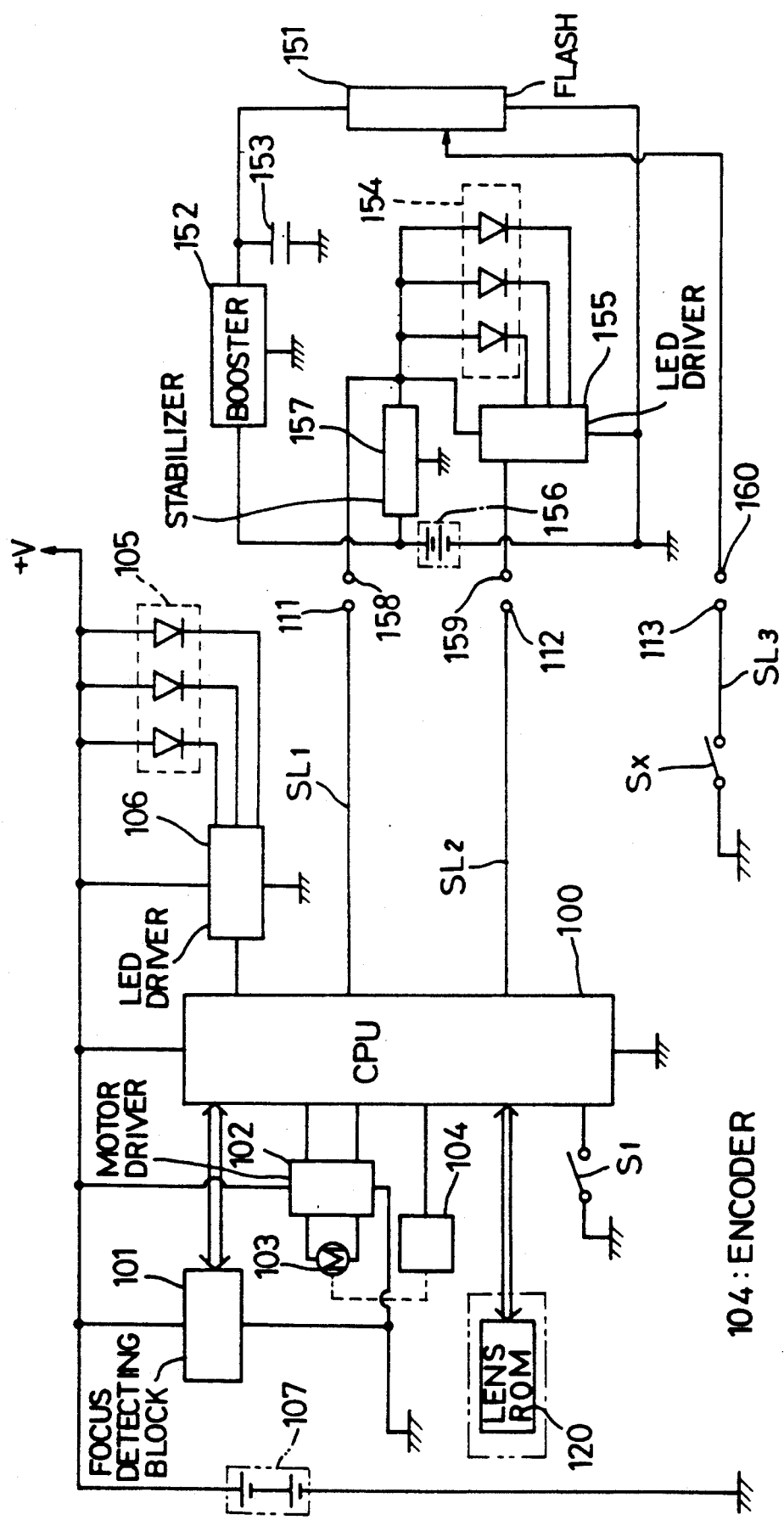

The lefthand side of FIG. 15 is a block contained in the camera body 1. Reference numeral 100 denotes a CPU for controlling an overall operation of the camera.

Reference 101 denotes a focus detecting block for effecting the photoelectric conversion on the images provided by the focus detecting optical system AO, for output to the CPU 100. The CPU 100 calculates a deviation of an image forming position of a photographic object formed by the objective lens 2 from an in-focus position of the camera by using the information received from the focus detecting block 101. In other words, the CPU 100 acts as focus detecting means. The focus detecting block 101 carries out the above operation in response to a focus detection control signal received from the CPU 100, and outputs to CPU 100 luminance information about the object which is obtained by monitoring outputs of the CCD line sensor Po. In other words, the focus detecting block 101 acts as object luminance detecting means. Reference 102 denotes a motor drive circuit operable, in response to a control signal from the CPU 100 provided on the basis of focus detection results output from the focus detecting block 101, for driving an autofocusing motor 103 to move the objective lens 2 to an in-focus position with respect to the photographic object.

Reference 104 denotes an encoder for outputting to the CPU 100 pulse signals number of which corresponding to amount of movement of the objective lens 2. On the basis of the signal from the encoder 104, the CPU 100 discerns a position of the objective lens 2.

Reference S1 denotes a focus detecting switch closable by pressing a release button 1a. When closed, the focus detecting switch S1 causes the CPU 100 to output the control signal to the focus detecting block 101 for commencing a focus detecting operation.

Reference 120 denotes a lens ROM provided for the objective lens 2 for storing lens information relating to the lens 2 such as the focal length and fully open aperture value. In response to a control signal from the CPU 100, the lens ROM 120 communicates the lens information to the CPU 100. The CPU 100 and lens ROM 120 are interconnected through a group of contacts of the camera body 1 and a group of contacts of the lens 2.

Reference 105 denotes the single LED pellet 16 of the second light emitter 4B, which is depicted with the opposite upper light emitting portions and a lower light emitting portion. The LED pellet 16 is operable by an LED drive circuit 106 which receives a control signal from the CPU 100.

Reference 107 denotes a source battery detachably mounted in the camera body 1 for supplying power to the CPU 100, focus detecting block 101, motor drive circuit 102, objective lens 2 and LED drive circuit 106.

Reference Sx denotes an X-contact closable with completion of a run of the leading screen of a focal plane shutter (not shown). A switching signal thereof is transmitted to the flash unit 3.

The righthand side of FIG. 15 is a block associated with the flash unit 3, which includes a flash portion 151, and a booster circuit 152 for raising charge voltage of a flash capacitor 153.

Reference 154 denotes the three LED pellets of the first light emitter 4A operable by an LED drive circuit 155.

Reference 156 denotes a source battery detachably mounted in the flash unit 3. Reference 157 denotes a stabilizing power source for stabilizing the output of the source battery 156 which is decreased during of flash charging, for application to the three LED pellets 154 of the first light emitter 4A and to the LED drive circuit 155.

The illustrated circuitry further includes a first signal line SL1 and a second signal line SL2 extending between the camera body 1 and flash unit 3, and a third signal line SL3 extending from the X-contact Sx to the flash unit 3. The first signal line SL1 transmits signals indicative of states of the flash unit 3 to the CPU 100. The second signal line SL2 transmits a control signal from the CPU 100 to the LED drive circuit 155 of the flash unit 3. The third signal line SL3 transmits the switching signal of the X-contact Sx to the flash portion 151. The three signal lines SL1-SL3 are connected when the flash unit 3 is attached to the hot shoe 1b of the camera body 1, through a group of contacts 111-113 arranged on the hot shoe 1b and a group of contacts 158-160 arranged on a foot of the flash unit 3.

Figure 16:
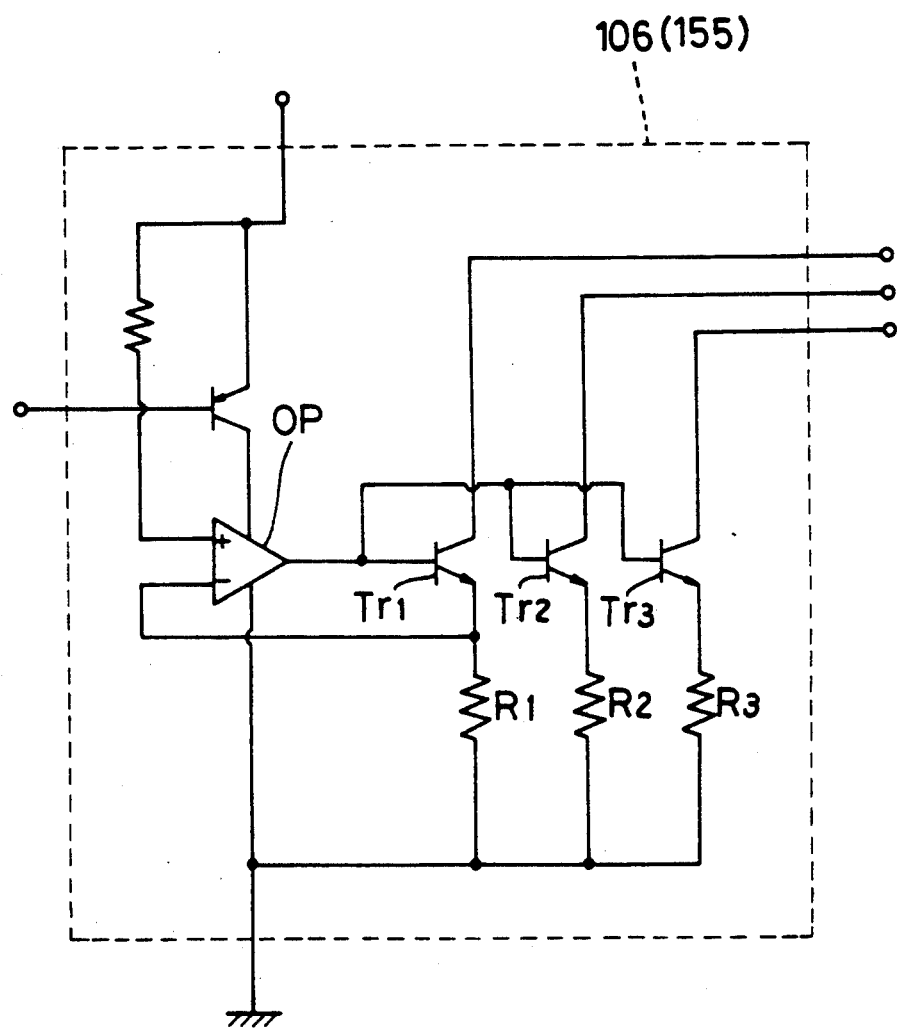

As shown in FIG. 16, the LED drive circuit 106 of the camera body 1 and the LED drive circuit 155 of the flash unit 3 invariably include an operational amplifier OP for monitoring voltage stabilization. The operational amplifier OP outputs signals to switching transistors Tr1-Tr3 for turning the latter on and off. These transistors Tr1-Tr3, respectively, control the three light emitting portions of the LED pellet 16 in the case of the LED drive circuit 106 in the camera body 1, and the three LED pellets 14a-14c in the case of the LED drive circuit 155 in the flash unit 3. The three transistors Tr1-Tr3 have emitter terminals connected to resistors R1-R3, respectively. The resistors R1-R3 have varied resistances selected as appropriate for differentiating current levels in the operative states of transistors Tr1-Tr3 to produce different emission patterns.

The CPU 100 actuates the auxiliary light emitting device 4 in response to the detection signal from the focus detecting block 101 acting as object luminance detecting means when a photographic object lacks in contrast for providing sufficient reliability and the object luminance is below a first predetermined luminance level, specifically when Bv is less than 4 in APEX value. Thus, the CPU 100 acts as auxiliary light emission control means. When the object luminance is below the first predetermined luminance level but not less than a second predetermined level, i.e. Bv is equal to or greater than −1 and less than 4 in APEX value, the CPU 100 judges that the object lacks in contrast through it has a high luminance level, and actuates the second light emitter 4B. When the object luminance is below the second predetermined luminance level, i.e. Bv is less than −1 in APEX value, the CPU 100 judges that the object is at a low luminance level, and actuates the first light emitter 4A. Thus, CPU 100 acts also as means for selectively actuating the first and second light emitters 4A and 4B.

The CPU 100 actuates the second light emitter 4B whenever the object luminance is below the first predetermined luminance level with the flash unit 3 removed from the camera body 1. When the object luminance is equal to or above the first predetermined luminance level, i.e. Bv is equal to or greater than 4 in APEX value, the CPU 100 judges that the focus detection is impossible by means of either auxiliary light beam, and actuates neither light emitter 4A or 4B regardless of the presence or absence of the flash unit 3. The operative states of the two auxiliary light emitters 4A and 4B are set forth in the following table, wherein the circles denote operative states and the crosses inoperative states:

|  |  | Detected Luminance of Object (By values) | | |
| --- | --- | --- | --- | --- |
|  |  |  | $-1$ | 4 |
| with flash | 1st emitter | O | X | X |
|  | 2nd emitter | X | O | X |
| without flash | 2nd emitter | O | O | X |

Figure 17B:
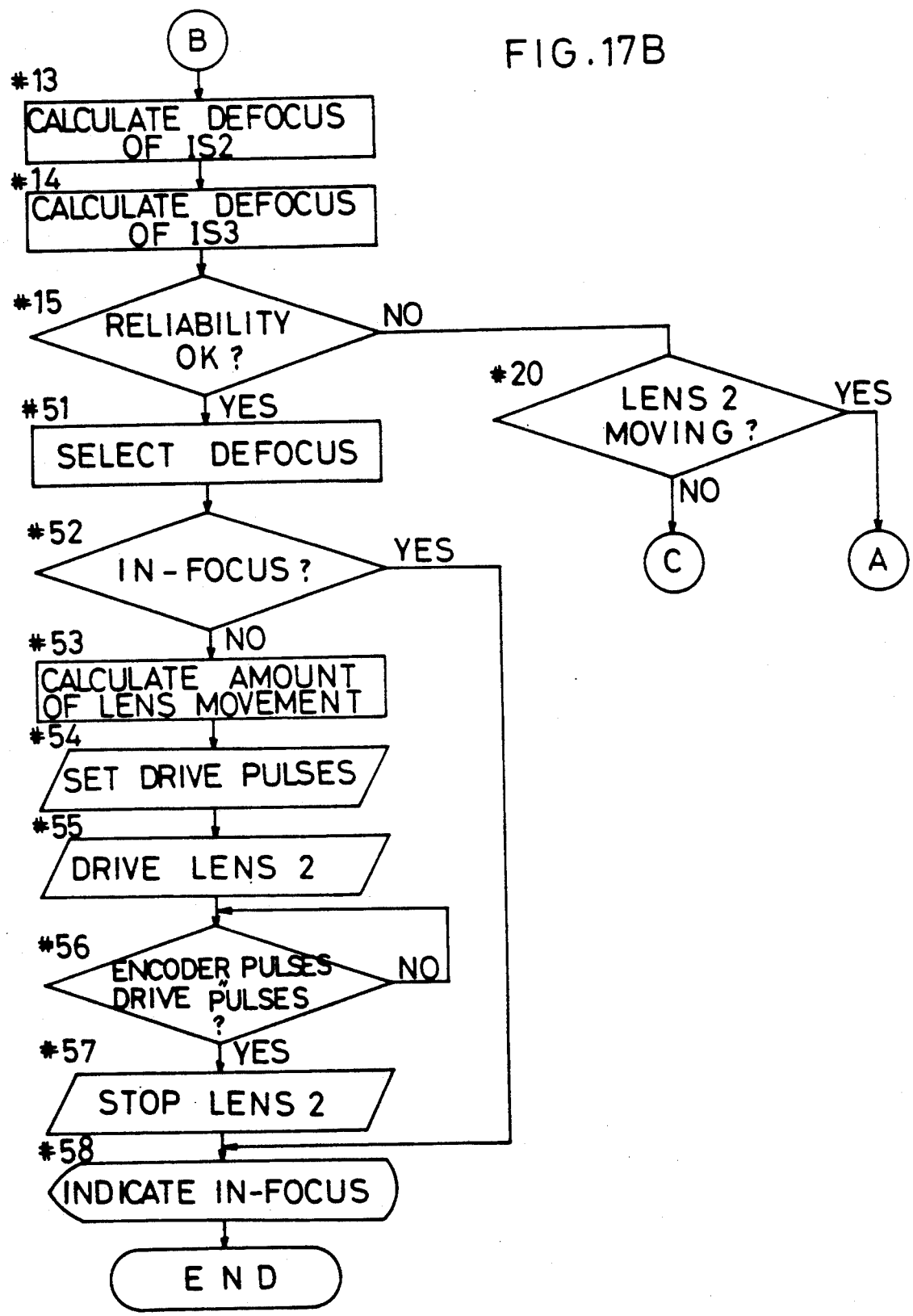

The autofocusing operation of this camera will be described with reference to the flow chart shown in FIGS. 17A–17C.

The operation starts when the focus detecting switch S1 is closed. First, at step #1 all registers and flags are initialized. After lens data are read from the lens ROM 120 at step #2, the control signal is output to the focus detecting block 101 at step #3 for starting CCD charging.

The program waits at step #4 for the charging to be completed, and then at step #5 the CPU 100 receives focus detection data from the focus detecting block 101. At steps #6 and #7, the CPU 100 outputs control signals to the LED drive circuit 106 of the second light emitter 4B and to the LED drive circuit 155 of the first light emitter 4A to stop light emission from the two light emitters 4A and 4B. Thereafter, at step #8, the CPU 100 judges from the signal input from the encoder 104 whether the objective lens 2 is at the closest end or infinite end.

If the lens 2 is judged to be at either end, CPU 100 outputs a control signal to the motor drive circuit 102 at step #9 for stopping the lens 2. At step #10, judgment is made whether the lens 2 is at the closest end or not. As will be described later, when a focus detecting calculation is unreliable because the photographic object lacks in contrast, and the luminance of the object is below the first predetermined luminance level, i.e. its Bv is less than 4, the objective lens 2 is reciprocated within its movable range in search of an object having a sufficient contrast for enabling focus detection (This operation is hereinafter referred to as the low contrast scan). If step #10 finds that the objective lens 2 is not at the closet end, the lens is at the infinite end, which indicates that an object having a sufficient contrast has not been found through the low contrast scan. In that case, the program comes to an end after giving an indication at step #100 that the focus detection is impossible.

If step #10 finds that the objective lens 2 is at the closest end, the low contrast scan is in progress. At step #11, CPU 100 outputs a control signal to the motor drive circuit 102 for driving the lens 2 toward the infinite end, which is followed by step #12. Also when the lens 2 is not judged to be at either end at step #8, the program jumps to step #12.

At steps #12 through #14, a deviation of the lens 2 from an in-focus position, namely a defocus amount, with respect to the photographic object is calculated at each focus detection region respectively by using the focus detection data input at step #5 from the focus detecting block 101. Subsequently, at step #15, judgment is made from correlation of calculation results whether the data are reliable or not, that is whether the objects have contrasts necessary for the focus detection or not.

If the data are judged unreliable, the program moves to step #20 for judging whether the objective lens 2 is being driven or not. If the lens 2 is being driven, the program returns to step #3 and repeats the foregoing steps. If the lens 2 is not being driven, the program moves to steps #21 and #22 for judging a luminance range of the object by using luminance information input from the focus detecting block 101 at step #5.

If the luminance of the object is found not less than the first predetermined luminance level, i.e. its Bv is equal to or greater than 4, CPU 100 outputs the control signal to the motor drive circuit 102 at step #31 for carrying out the low contrast scan and driving the objective lens 2 toward the closest end. Then the program returns to step #3 and repeats the foregoing steps.

If the luminance is judged less than the second predetermined luminance level, i.e. its Bv is less than $-1$, judgment is made at step #23 whether the flash unit 3 is mounted or not. If the flash unit 3 is not mounted, the program moves to step #25. If the flash unit 3 is mounted, judgment is made at step #24 whether this is a second time that this loop is taken. If the loop is being taken for the first time, CPU 100 outputs the control signal at step #32 to the LED drive circuit 155 of the first light emitter 4A for emitting the first auxiliary light beam. Thereafter the program returns to step #3 and repeats the foregoing steps.

If step #24 judges that this loop is being take for a second time, it indicates that there is no reliability in the focus detection results obtained by executing step #32 for projecting the first auxiliary light beam. The program then moves to step #31 for carrying out the low contrast scan.

If the luminance of the object is less than the first predetermined luminance level and equal to or greater than the second predetermined luminance level, i.e. its Bv is equal to or greater than $-1$ and less than 4, judgment is made at step #25 whether this loop is being taken for the second time. The program moves to step #25 also when the luminance is judged less than the second predetermined luminance level, i.e. its Bv is less than $-1$, and the flash unit 3 is not mounted. If step #25 finds that this loop is being taken for the first time, CPU 100 outputs the control signal at step #33 to the LED drive circuit 106 of the second light emitter 4B for emitting the second auxiliary light beam. Thereafter the program returns to step #3 and repeats the foregoing steps.

If step #25 judges that this loop is being take for a second time, it indicates that there is no reliability in the focus detection results obtained by executing step #33 for projecting the second auxiliary light beam. The program then moves to step #31 for carrying out the low contrast scan.

On the other hand, if step #15 finds the data to be reliable, selection is made at step #51 among the defocus amounts calculated at steps #12 through #14 for carrying out focus detection. At step #52, judgment is made whether the selected defocus amount is below a predetermined value or not, namely whether the objective lens 2 is within an in-focus range or not.

If the lens 2 is outside the in-focus range, an amount of lens movement is derived from the defocus amount at step #53. The amount of lens movement is corrected in the case that the lens 2 is being driven during the calculation.

Thereafter, CPU 100 outputs control signals to the motor drive circuit 102 for setting the number of pulses for driving the AF motor 103 (step #54) and for driving the objective lens 2 (step #55). After waiting at step #56 until the number of pulses input from the encoder 104 reaches the number of drive pulses, CPU 100 outputs a control signal at step #57 to the motor drive circuit 102 for stopping the lens 2. The program then moves to step #58. The program jumps to step #58 also when step #52 finds that the lens 2 is in in-focus range. The program completes this routine after executing step #58 for giving an "in-focus" indication and completes the focus detecting operation.

Another preferred embodiment relating to the auxiliary light emission will be described next.

Figure 18:
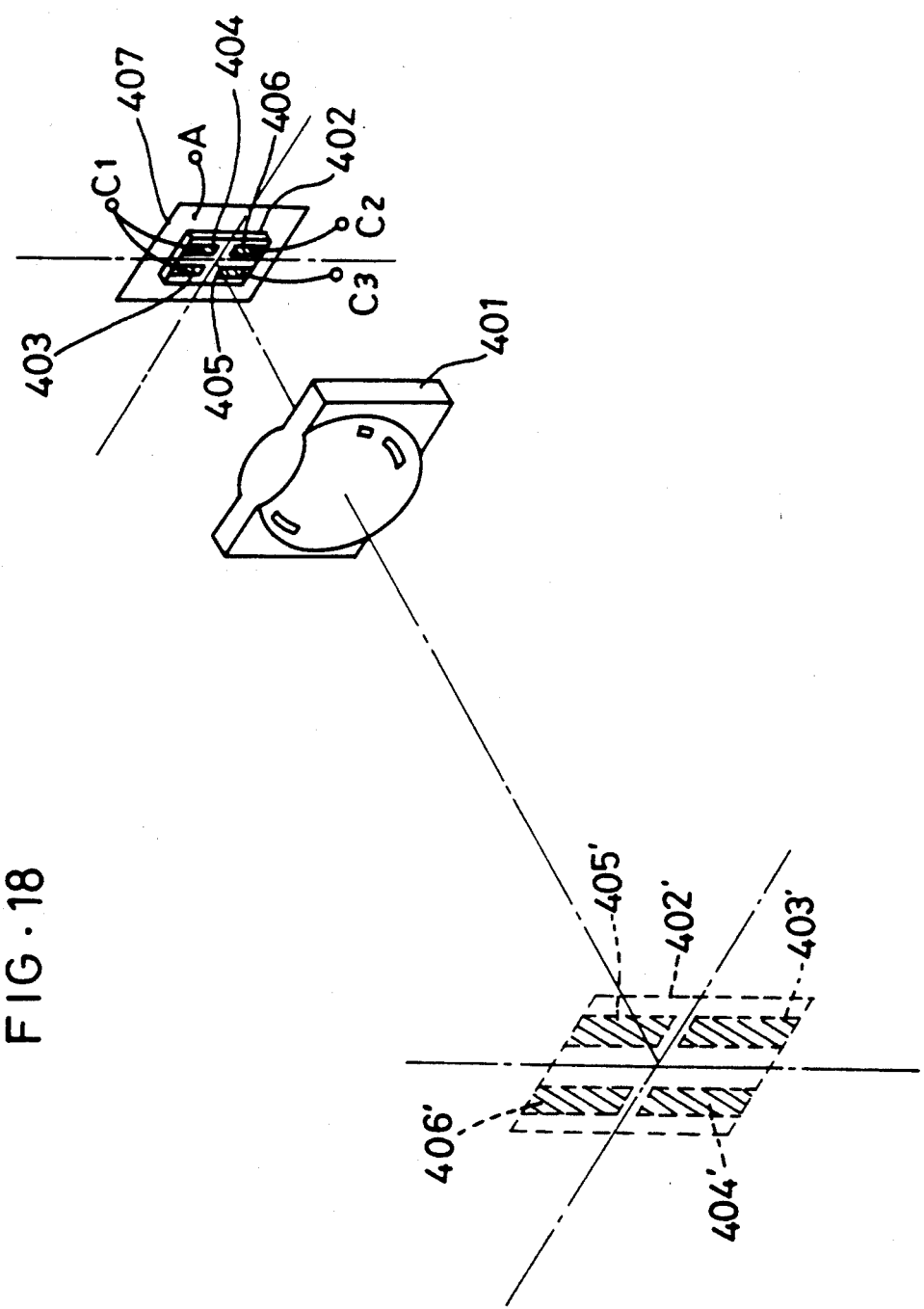

Referring to FIG. 18, a projecting lens 402 projects light from a light emitter such as an LED 402 onto a photographic object. The light from the light emitter 402 is projected onto the object as a bright part 402'. The light emitter 402 has a plurality of electrodes 403-406 arranged thereon, whose images are projected onto the object as dark parts 403'-406', respectively. In this way, a contrast of light and shade is produced on the object. The electrodes 403 and 404 are connected to a common lead C1, while the electrode 405 is connected to a lead C3 and the electrode 406 to a lead C2. The light emitter 402 includes an anode which is common to all the electrodes on a substrate 407 and is connected to a lead A.

Figure 19:
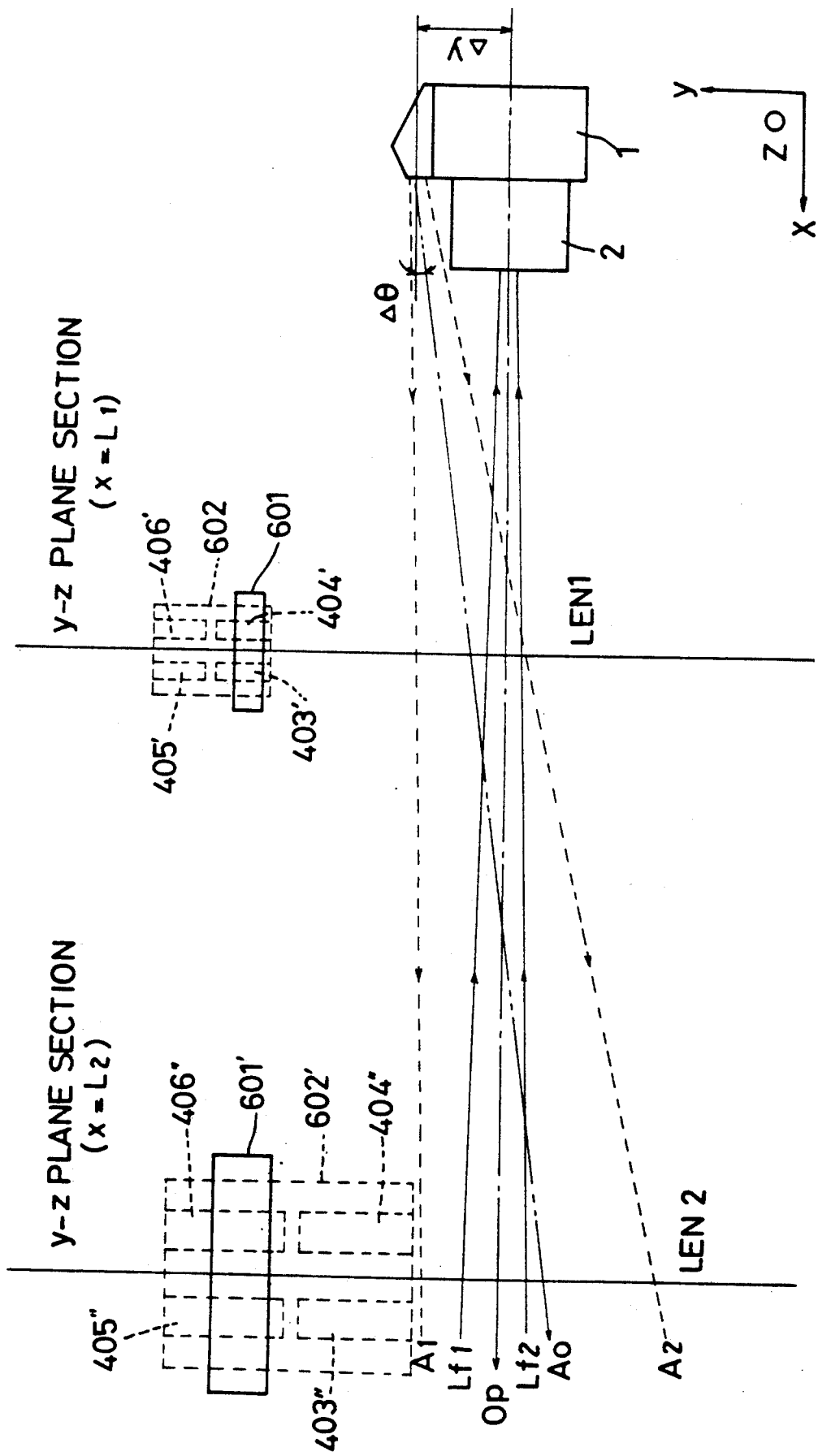

The reason for providing separate leads for the respective electrodes will be explained with reference to FIG. 19. In FIG. 19, a camera body 1 includes a focus detector utilizing light bundles within a range referenced Lf1-Lf2 for focus detection. The camera body 1 further includes an auxiliary light emitting device disposed upwardly by $\Delta y$ of the optical axis Op of an objective lens 2, which results in a parallax of $\Delta y$. The auxiliary light emitting device, therefore, has an optical axis Ao downwardly inclined at $\Delta \theta$ with respect to the optical axis Op. In this case, the light beam projected from the auxiliary light emitter has an upper limit A1 and a lower limit A2. When the photographic object is at a short distance as at LEN1, a focus detection area 601 and an auxiliary illumination area 602 are in a relative positional relationship as depicted in a y-z plane section (x=LEN1) at an upper righthand position in FIG. 19. Similarly, when the photographic object is at a long distance as at LEN2, a focus detection area 601' and an auxiliary illumination area 602' are in a relative positional relationship as depicted in a y-z plane section (x=LEN2) at an upper lefthand position in FIG. 19. Generally, as an elimination distance increases, the intensity of illumination decreases in proportion to the inverse number of a square of the distance. It is therefore necessary to provide the greater auxiliary illumination intensity the longer the distance of the photographic object is. It is thus desirable, in FIG. 19, that the illumination intensity (for an upper part of the auxiliary illumination area) is greater when the object is at the distance LEN2 than the illumination intensity (for a lower part of the auxiliary illumination area) when the object is at the distance LEN1. In this embodiment, different intensities are assigned to the auxiliary illumination areas by varying the electric current supplied to the electrodes. Specifically, a small amount of current is supplied to the electrodes 403 and 404 while a large amount of current is supplied to electrodes 405 and 406.

The focus detection area in FIG. 19 corresponds to the area IS1 described with reference to FIG. 4.

Figure 20:
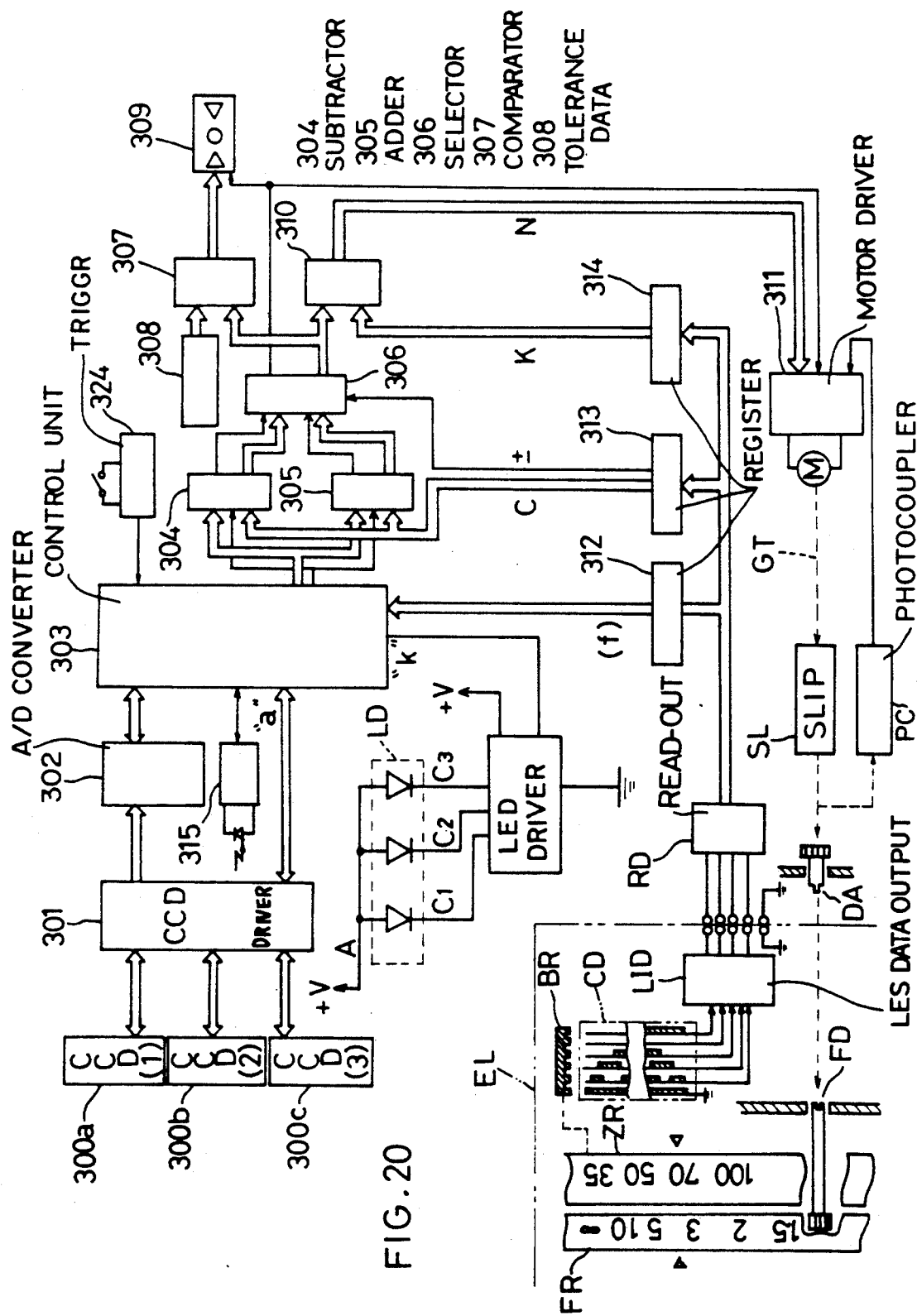

FIG. 20 is a block diagram of another preferred circuitry of the focus detecting device.

References 300a-300c denote focus detecting sensors comprising CCDs. Reference 301 denotes a CCD drive circuit for outputting drive signals to the focus detecting sensors 300a-300c. Reference 302 denotes an A/D conversion circuit for converting analog signals of the sensors 300a-300c received from the CCD drive circuit 301 into digital signals for input to a control unit 303. The circuit controls the focus detecting device, and in particular stores the digital signals received from the A/D conversion circuit 302 in appropriate registers, and processes these digital signals in accordance with a predetermined algorism for deriving an amount and a direction of defocus of the objective lens.

Reference 304 denotes a subtracting circuit which receives an output data of the control unit 303 and compensation data C output from a register 313 regarding the spherical aberration of the objective lens. The subtracting circuit 304 subtracts the compensation data C from the amount of defocus, and outputs the result together with a direction signal. Reference 305 denotes an adding circuit which receives an output data (of the amount and direction of defocus) of the control unit 303 and the compensation data C output from the register 313. The adding circuit 305 adds the compensation data C to the amount of defocus, and outputs the result together with a direction signal. Reference 306 denotes a selector circuit which receives the outputs of the subtracting circuit 304 and adding circuit 305 and a positive or negative signal from the register 313. The selector circuit 306 selects the output data and signal of the subtracting circuit 304 when the signal received from the register 313 is negative, and the output data and signal of the adding circuit 305 when the signal received from the register 313 is positive. The defocus data output from the selector circuit 306 is input to a multiplying circuit 310 and a comparator circuit 307. The multiplying circuit 310 also receives a conversion coefficient K for focus adjustment from a register 314. The conversion coefficient K is determined on the basis of the focal length and information concerning the mechanical construction of a lens driving system (such as the helicoid lead) which are necessary for determining an amount of lens movement corresponding to the amount of defocus. A required number of motor rotations N is obtained by multiplying the amount of defocus and the conversion coefficient K together. A signal showing the number of motor rotations N and a direction of rotation is input to a motor drive circuit 311. The comparator circuit 307 receives, along with the amount of defocus, a focusing tolerance range data from a focusing range circuit 308, compares the two data and outputs an in-focus or out-of-focus data. Reference 309 denotes a display circuit for receiving the output of the comparator circuit 307 and the defocus direction signal from the selector circuit 306, and gives an "in-focus" or "out-of-focus" display and a direction in the latter case. The motor drive circuit 311 receives the number of motor rotations N and the direction of rotation as noted above, and a motor M is rotated in accordance with these data. The rotation of the motor M is transmitted to a drive shaft DA through a gear train GT and a slip mechanism SL as indicated in dotted lines. An encoder comprising a photocoupler PC is connected to a position downstream of the slip mechanism SL for monitoring rotation of the drive shaft DA and feeding the information back to the motor drive circuit 311, thereby to rotate the motor M predetermined times. Reference 324 denotes a trigger circuit for generating a focus detection start signal in response to an operation of a shutter release button or a different switch, the resulting signal being transmitted to the control unit 303.

References 312, 313 and 314 denote register circuits which receive objective lens focal length information f, the compensation data C regarding the aberration of the objective lens, and the conversion coefficient K for the focus adjustment read by a readout circuit RD.

Reference 315 denotes a metering circuit for measuring the brightness of a photographic object, and comparing the measured brightness Bv with two reference brightness levels (for example, Bv1=4 and Bv2=0). The metering circuit 315 judges whether the brightness of the object is in a high brightness range (i.e. Bv is greater than Bv1), a low brightness range (i.e. Bv is less than Bv2) or an intermediate brightness range (i.e. Bv is between Bv1 and Bv2 or equal to one of them). Then the metering circuit 315 outputs a resulting brightness range signal to the control unit 303.

A signal line k extending from the control unit 303 is connected to an LED drive circuit. When the signal transmitted through this line k is in high level, the LED drive circuit is actuated to drive the light emitting diodes LD.

The foregoing is the construction mounted in the camera body. A construction included in the objective lens, which is interchangeable, will be described next. The interchangeable lens is shown as enclosed by a dot and dash line at lefthand bottom position in FIG. 20. This lens comprises a zoom lens in the illustrated example. Reference ZR denotes a zoom ring which is operable from outside and includes a brush BR rotatable with the zoom ring ZR. A stationary lens barrel includes a code deck CD opposed to the brush BR of the zoom ring ZR, for producing a digital code signal corresponding to rotation of the zoom ring ZR, namely each focal length thereby determined. The code signal is input to a lens information output circuit LID including a ROM. The ROM stores lens data such as the objective lens focal length information f, the compensation data C regarding the lens aberration, the conversion coefficient K for the motor rotation and so on, which are necessary for the autufocusing carried out in the camera body. The digital code signal designates addresses in the ROM, and the read-out circuit RD in the camera body reads the lens data to be transmitted to the registers 312-314. The focal length information f, compensation data C and conversion coefficient K are renewable in accordance with zooming by the zoom lens for output to the read-out circuit RD. The camera body and the interchangeable lens are connected through terminals such as power source terminals, synchronous clock pulse terminals, read-out signal terminals, serial data terminals and grounding terminals. A driven shaft FD is meshed with a focusing ring FR for driving the latter.

How the foregoing construction operates will be described next. When the interchangeable lens is attached to the camera body, the lens information output circuit LID and the read-out circuit RD are interconnected through the terminals, and the ground terminals are also connected. Further, the drive shaft DA and the driven shaft FD are mechanically engaged through a recess and a projection for moving the focusing lens. When the operator touches the shutter button to carry out a focus adjustment, power is first supplied from the read-out circuit RD to the lens information output circuit LID through the power source terminals. Thereafter the contents of the ROM in the lens information output circuit LID are read out in response to signals transmitted through the synchronous clock pulse terminals and read-out signal terminals. The focal length information f is input to the register 312, the compensation data C regarding the aberration to the register 313, and the conversion coefficient K for the motor rotation to the register 314. These inputs are repeated, accompanying data renewals, every now and then with predetermined timing. The contents of the ROM read out are dependent upon the addresses designated by the digital codes on the code deck CD which are determined by a position of the brush BR movable with setting of the zoom ring ZR. Consequently, when the focal length is varied with zooming by the zoom lens, for example, the focal length information f stored in the ROM will change accordingly. Proper focal length information f is thus input to the register circuit 312 through the lens information output circuit LID and read-out circuit RD. When the data input is completed, the control unit 303 outputs CCD drive drive pulses to the CCD drive circuit 301 through a signal line a. In response to the CCD drive pulses, the CCD drive circuit 301 transmits a CCD integration starting signal to the focus detecting sensors 300a-300c. The respective focus detecting sensors transmit outputs Vad1-Vad3 of monitoring light-receiving elements (as referenced 201 in FIG. 21) to the CCD drive circuit 301. The CCD drive circuit 301 compares voltages Vad1-Vad3 with a reference voltage Vref and, when the voltages Vad1-Vad3 become a predetermined level, outputs a CCD integration stopping signal to the focus detecting sensors and a CCD drive stopping signal to the control unit 303. Unless the CCD drive stopping signal is output from the CCD drive circuit 301 after lapse of a predetermined time following the output of the CCD drive pulses to the CCD drive circuit 301, the control unit 303 outputs CCD drive termination forcing pulse to the CCD drive circuit 301. Then CCD drive circuit 301 outputs the CCD integration stopping signal to the focus detecting sensors. At this time, the CCD drive circuit 301 multiplies the sensor outputs by gains corresponding to levels of the monitor outputs Vad1-Vad3.

Thereafter the CCD drive circuit 301 transmits the sensor outputs to the A/D conversion circuit 302. The sensor outputs are digitalized by the A/D conversion circuit 302 and stored in the memory in the control unit 303. Then the control unit 303 processes the data in accordance with the predetermined algorism. By deriving phase differences among these data from this process, an amount and a direction of defocus are determined with respect to each focus detecting sensor.

Where there are a plurality of focus detecting areas, a process must be carried out for deciding which area should be employed. This process is not the subject of the present invention, and is therefore omitted herefrom (it is particularly described in Japanese Patent Publication Kokai No. 59-146028, for example). The amount of defocus $\Delta L$ and the defocus direction signal are input to the subtracting circuit 304 and adding circuit 305. On the other hand, the compensation data C is transmitted from the register circuit 313 to one input terminal of each of the subtracting circuit 304 and adding circuit 305. In addition, the register circuit 313 supplies the selector circuit 306 with the positive or negative signal indicating a compensating direction. The selector circuit 306 takes in the output data and signal of the subtracting circuit 304 when the signal received from the register 313 is negative, and the output data and signal of the adding circuit 305 when the signal received from the register 313 is positive. The data and signal selected by the selector circuit 306 are input to the multiplying circuit 310 and comparator circuit 307. The multiplying circuit 310 multiplies the data and signal by the conversion coefficient K for the motor rotation received from the register 314, to produce the number of rotation data N for application to the motor drive circuit 311. The comparator circuit 307 compares the defocus amount data with the date received from the focusing range circuit 308, and lights an in-focus indicator element if the defocus amount data is within the in-focus tolerance range. The selector circuit 306 further outputs the defocus direction signal to the motor drive circuit 311 and display circuit 309, for indicating the direction of rotation of the motor M and for lighting a left or right out-of-focus indicator element for displaying a defocus state. The motor M is rotated in accordance with the number of motor rotation data N and the rotating direction signal input to the motor drive circuit 311. The rotation of the motor M is transmitted to the drive shaft DA through the gear train GT and slip mechanism SL, and further to the focusing ring FR through the driven shaft FD of the interchangeable lens, thereby to drive a focusing optical system, not shown, by the amount of defocus along the optical axis. The rotation of the drive shaft DA is accurately controlled by being monitored by the encoder comprising a photocoupler PC for feedback to the motor drive circuit 311.

When the photographic object is in a low brightness level or has a low contrast, it is difficult for the control unit 303 to obtain a correct amount of defocus and a correct direction thereof. In such a case, the control unit 303 transmits a high-level signal through the signal line k to drive the light emitting diodes LD. The light emitting diodes LD then illuminate and give a contrast to the object for commencing a next focus detecting operation.

Figure 21:
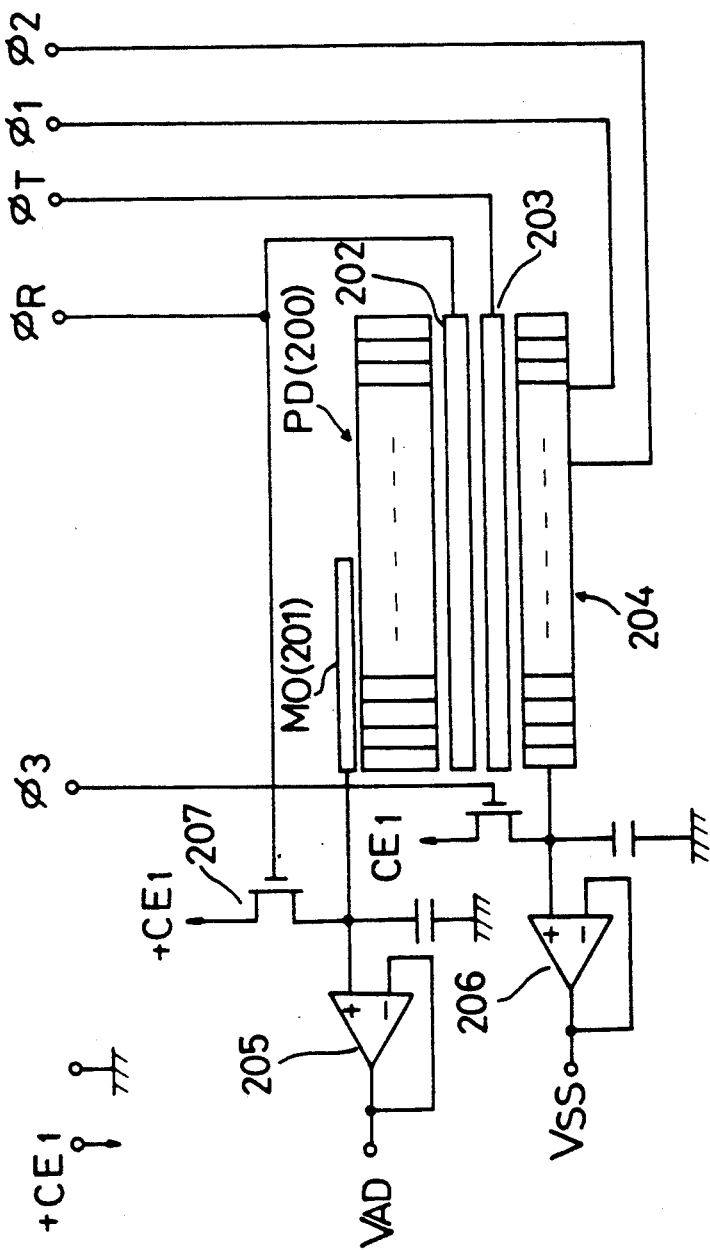

FIG. 21 shows details of a preferred focus detecting sensor according to the present invention. Reference 200 denotes a line sensor comprising a linear photodiode. Its output is transferred through a transfer gate 203 to a shift register 204, and output from an output terminal Vss of an operational amplifier 206. Reference 201 denotes a rectangular photodiode whose output is output from an output terminal Vad of an operational amplifier 205. The photodiode 201 is a monitor for measuring an amount of light impinging on the line sensor 200, and is disposed adjacent the line sensor 200.

Reference 202 denotes an integration clear gate for clearing an electric charge generated from the line sensor 200 when oR is in high level. Reference 203 denotes a charge transfer gate for storing the charge generated from the line sensor 200 in the shift register 204 when $\phi$T is in high level. The shift register 204 acts to transfer accumulated electric charges by clock pulses $\phi$1 and $\phi$2 to the operational amplifier 206 for reading out a signal. Output signal Vad of the monitor 201 is transmitted to the CCD drive circuit 301 in FIG. 20. Output signal Vss of the line sensor 200 is also transmitted to the CCD drive circuit 301.

The monitor output Vad and line sensor output Vss will be described in greater detail now. When the CCD drive start signal is input from the CCD drive circuit 301 to the focus detecting sensor 300a (300b, 300c), $\phi$R becomes high level first, whereby the charge of the monitor 201 is cleared through the integration clear gate 202 for effecting initialization of the monitor 201. At the same time, the charge of the line sensor 200 is cleared through the integration clear gate 202 for effecting initialization of the line sensor 200. Thereafter the integration clear gate 202 is closed for commencing accumulation of charges. The output of monitor 201 is accumulated and output from the output terminal Vad of operational amplifier 205, and therefore the monitor output Vad degreases (or increases) with progress of time. When the monitor output Vad reaches a predetermined level (such as Vref), the CCD drive circuit 301 outputs charge transfer pulse $\phi$T to the transfer gate 203, whereby the charge generated from the line sensor 200 is transferred through the transfer gate 203 to the shift register 204. When the amount of light entering the monitor output Vad is low and the monitor output Vad does not reach Vref after a predetermined integration time, the CCD drive circuit 301 causes the charge transfer pulse $\phi$T to be input to the transfer gate 203 for transferring the charge of line sensor 200 to the shift register 204 without continuing the integrating operation. The charge of the shift register 204 is successively output to the CCD drive circuit 301 in response to a signal received from the CCD drive circuit 301.

An auxiliary light mode of the above preferred embodiment will be described next.

As shown in FIG. 22, the auxiliary light mode (AL mode) comprises two types, i.e. a low light compensating type ALB and a low contrast compensating type ALS.

The low light compensating type ALB is utilized when the photographic object is dark (its Bv is equal to or less than 0, for example) and does not provide a sufficient amount of light for enabling the CCDs to effect focus detection. In this case, the auxiliary light emitters are driven to illuminate and give an effective contrast to the object for enabling the focus detection.

The low contrast compensating type ALS is utilized when the object lacks in a sufficient contrast for providing correlative values for use in the focus detecting operation. In this case, the auxiliary light emitters are driven to give an effective contrast to the object, and ambient light removal and adding processes are carried out for enabling the focus detection. The low contrast compensating type will be described in greater detail later.

The functions "ALS on" and "ALS off" are for controlling whether the auxiliary light should be emitted or not at CCD integration times, which are used in the ambient light removal process.

Figure 23A:
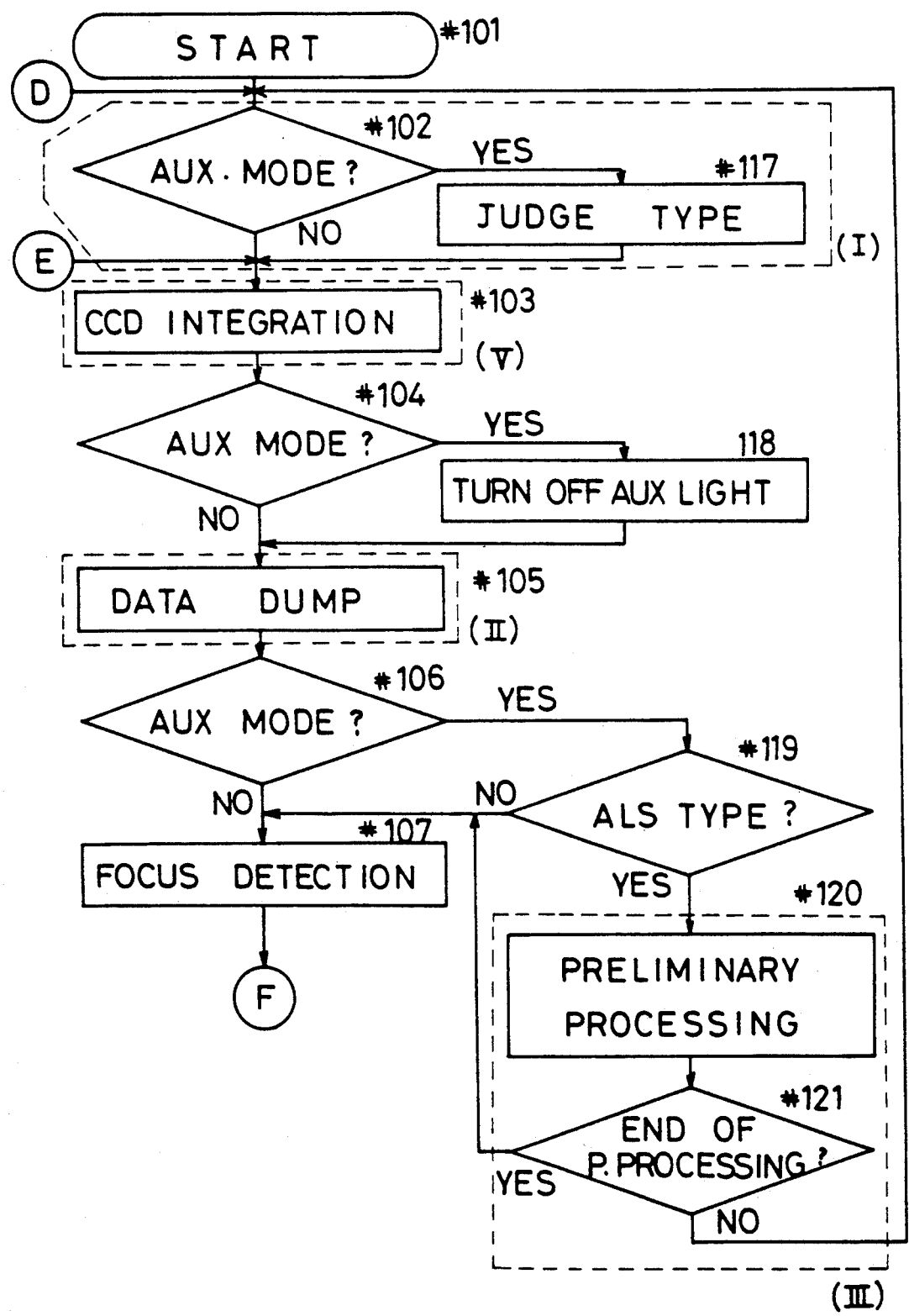
FIGS. 23A and 23B are flow charts illustrating a focus detecting operation.

Next, the processes carried out within the control unit 303 will be described with reference to the flow charts shown in FIGS. 23A and 23B.

At step #101, the control unit 303 is started by pressing the shutter button or other switch, to set the auxiliary light mode off. At step #102, judgment is made whether the auxiliary light mode is on or off. Since the auxiliary light mode is off, the CCD integration is carried out at step #103.

After the CCD integration, judgment is made at step #104 whether the auxiliary light mode is on or off. Since, again, the auxiliary light mode is off, a data dump is effected at step #105. The data dump means the analog-digital conversion of the outputs of the CCDs and storage of the converted data in the memory of the control unit 303. Thereafter, judgment is made again at step #106 whether the auxiliary light mode is on or off. Here again, the auxiliary light mode is off and a focus detecting operation is carried out at step #107. In this operation, focus detection value and judgment value representing the reliability of the focus detection value are calculated in accordance with the predetermined algorism by using the CCD outputs stored in the memory. At step #108, judgment is made whether the judgement value is within a predetermined range or not. If the judgement detection value is outside the predetermined range, it is judged that focus detection is impossible (because of a low contrast). Supposing that the judgement value is within the predetermined range, the program moves to step #109 for judging whether the focus detection value derived at step #107 indicate an in-focus state or not. In the case of an in-focus state, an in-focus display is given at step #116. If not, the objective lens is driven at step #110 toward an in-focus position referring to the detection values calculated at step #107. Then the program returns to step #102 to carry out the focus detection again. In the described loop, the auxiliary light mode is turned off and the focus detection is carried out without auxiliary illumination.

If step #108 finds that the focus detection is impossible (i.e. the case of a low contrast), the program moves to step #111 for judging whether the auxiliary light mode is on or off. Since the auxiliary light mode is off, the program moves on to step #112. At step #112, judgment is made whether the luminance of the photographic object is greater than the predetermined level (Bv=4, for example) or not. If the luminance of the object is greater than this level, the auxiliary light mode is not employed. This is because, when the luminance of the object is at a high level, effective CCD outputs (i.e. contrast) are not made available even if the auxiliary beams are projected. In other words, the CCD outputs when the auxiliary beams are projected remain the same as when the beams are not projected. Thus, when the luminance of the object is higher than the predetermined level, a low contrast display (i.e. a focus detection impossible display) is made at step #123 which is followed by step #103. When the luminance of the object is below the predetermined level, the luminance of the object is compared with the second luminance level (Bv=0) at step #113. If the luminance of the object is below the second luminance level, for example, the auxiliary light mode is turned on with the low light compensation type flag (ALB) set at step #114, which is followed by a return to step #102. When the luminance of the object is above the second luminance level, the auxiliary light mode is turned on with the low contrast compensation type flag (ALS) set at step #115, which also is followed by a return to step #102.

A process taken at step #102 following the setting of flag ALB will be described first. After finding at step #102 that the auxiliary light mode is on, the program moves to step #117 for judging the auxiliary light type to effect on/off control of the light emitters. Since the ALB type is in operation at this time, the light emitters are turned on. At step #103, a CCD integration is carried out, after which step #104 finds that the auxiliary light mode is on. At step #118 the light emitters are turned off, which is followed by a data dump carried out at step #105.

Subsequently, step #106 finds that the auxiliary light mode is on and step #119 judges the auxiliary light type. Since the ALB type is on, the program moves to step #107 for carrying out a focus detecting operation. At step #108, judgment is made from the results of the focus detecting operation whether focus detection is possible or not. If focus detection is not possible, the program moves to step #111 where it is found that the auxiliary light mode is on, to step #122 for turning the auxiliary light mode off, to step #123 for giving the low contrast display, and back to step #103. When the focus detection is found possible at step #108, the program moves to step #109 for judging whether the lens is in an in-focus position or not. If the lens is in the in-focus position, an in-focus display is made at step #116 to complete the focusing operation. If step #109 does not find the lens to be in the in-focus position, the lens is driven by an appropriate amount at step #110 and the focus detecting operation is carried out again at steps #102 et seq. This focus detecting operation is repeated with the ALB type maintained on.

Next, the case of the ALS type being set at step #115 will be described.

After the flag ALS is set at step #115, the program returns to step #102 finds that auxiliary light mode is on, and then the program moves to step #117 for judging the auxiliary light type, together with a judgment as to "ALS on" or "ALS off", to effect on/off control of the light emitters. Since this is the first sequence for the ALS type, the light emitters are turned on. At step #103, a CCD integration is carried out, after which step #104 finds that the auxiliary light mode is on. At step #118 the light emitters are turned off, which is followed by a data dump carried out at step #105. Subsequently, step #106 finds that the auxiliary light mode is on and step #119 judges the auxiliary light type. Since the ALS type is on, the program moves to step #120 for carrying out a preliminary processing such as the CCD addition and ambient light removal (details of which will be described later). At step #121, judgment is made whether results of the preliminary processing meet required conditions or not (details will be described later). If the results are satisfactory, a focusing detecting operation is carried out at step #107 on the basis of the pre-processed data. The subsequent process is the same as the case of ALB type.

Figure 24:
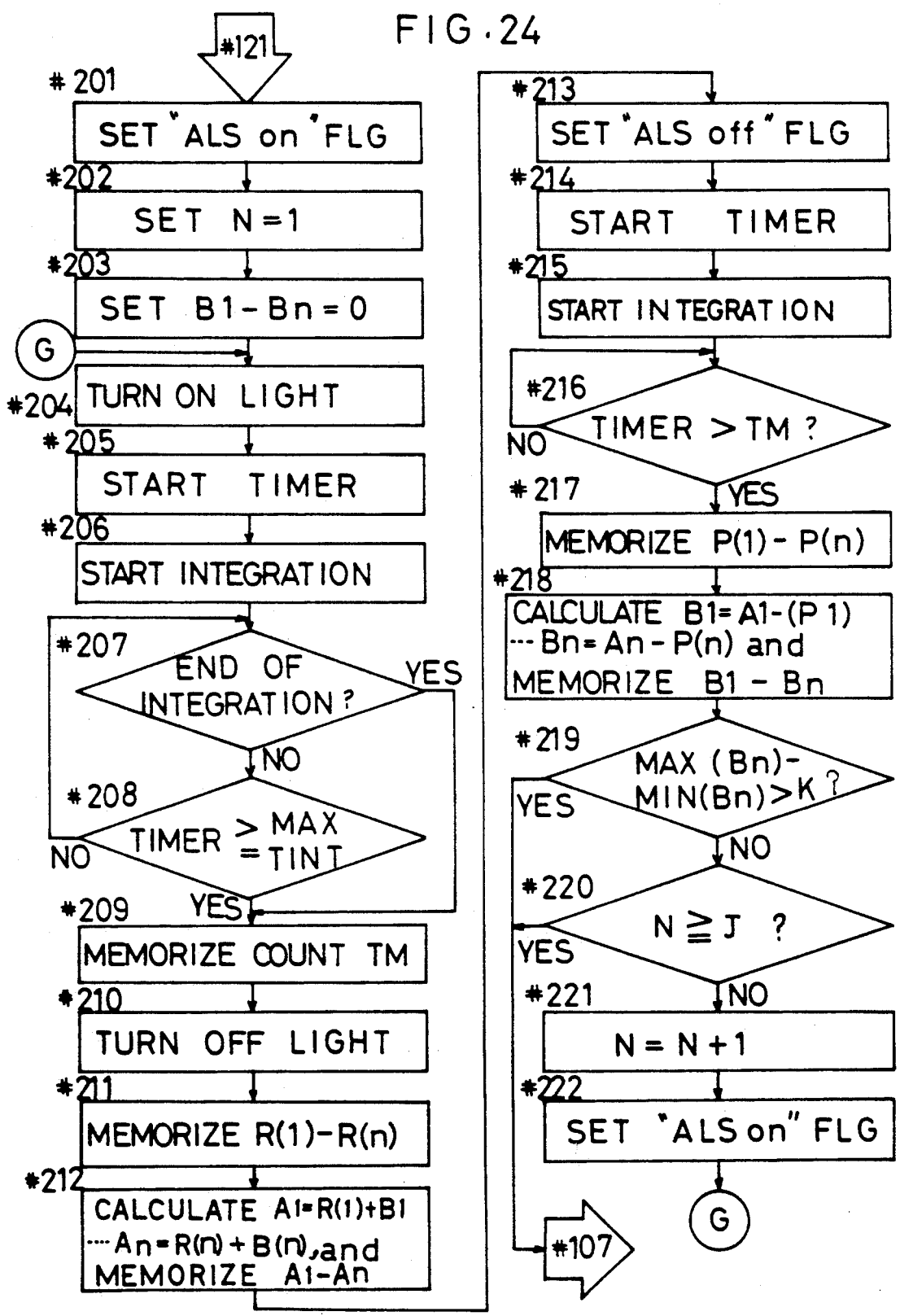

When step #121 finds that the pre-processed data do not meet the required conditions, the program returns to step #102. Thereafter the focus detecting operation is continued by the ALS type. At this time, the CCD integration at the time of auxiliary light emission and CCD integration at the time of non-emission are carried out alternately. This operation will be described with reference to the flow chart shown in FIG. 24. First, the flag "ALS on" is set at step #201, and the number of times N is set to "1" at step #202. The number of times N represents the number of times where the CCD integration at the time of auxiliary light emission and CCD integration at the time of non-emission are regarded as one loop.

Figure 23B:
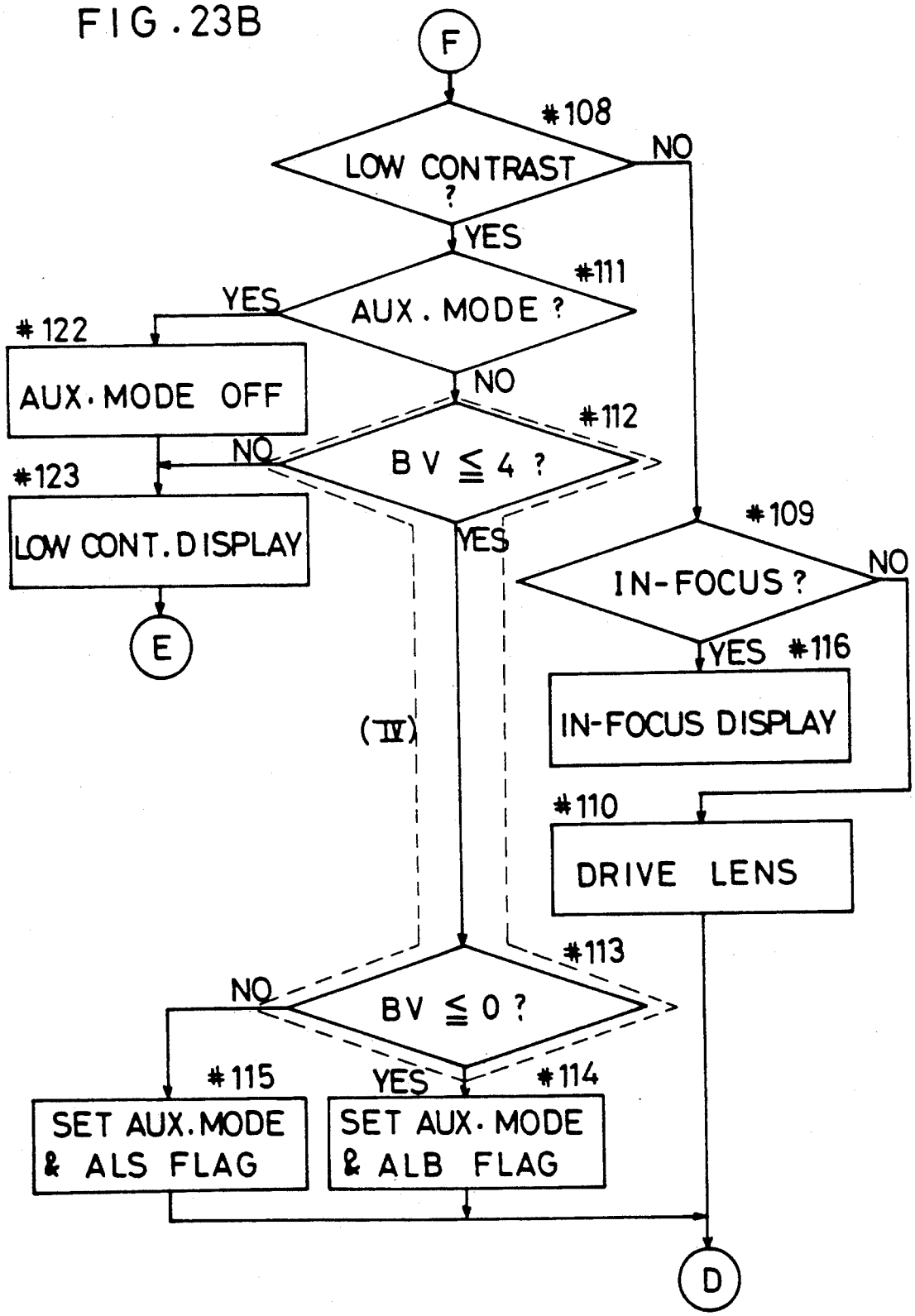

The steps #201 and #202 correspond to step #115 in FIG. 23B.

At step #203, B1-Bn are set to zero. The B1-Bn are memories for adding outputs derived by subtracting CCD data P(n) at the non-emission time from CCD data R(n) at the emission time, which is initially set to zero. Then, the auxiliary light is turned on at step #204 (corresponding to steps #102 and #117). At step #205, a timer in the control unit 303 is started. This timer is used as a monitor for checking a CCD charging time (integration time) as will be described later.

At step #206, the control unit 303 transmits the CCD integration start signal to the CCD drive circuit 301 for starting the charging. Thereafter, at step #207, judgment is made whether the CCD integration has completed or not. If it has completed, the program moves to step #209. If not, the program moves to step #208 for judging whether the timer started at step #205 has reached a MAXTINT time or not. If the timer has not reached the MAXTINT time, the program returns to step #207 for checking again whether the CCD integration has completed or not. If the timer has reached the MAXTINT time, the control unit 303 transmits the CCD integration force-terminating signal to the CCD drive circuit 301, and the program moves to step #209.

At step #209 a timer count TM indicating the CCD integration time during the auxiliary light emission is memorized. This timer count TM is used as the CCD integration time for the next light emission. Thereafter, the auxiliary light is turned off at step #210, and CCD data R(1)-R(n) of the light emission time are memorized at step #211. Then, an adding process is carried out at step #212. At this step, the data R(1)-R(n) of the light emission time are added to the data Bn derived from previous adding and ambient light processes. Subsequently, the flag "ALS off" is set at step #213, the timer is started at step #214, and the CCD integration is started at step #215. The integration made at this time is the integration of the non-emission time at which only ambient light is received by the system.

At step #216, the CCD integration is continued until the timer reaches the integration time TM of the previous light emission period. When the timer count reaches the time TM, the CCD integration is forcibly terminated and at step #217 data P(1)-P(n) of the non-emission period are stored in the memory.

The CCD integration time during the non-emission period is equalized to the CCD integration time during the light emission period in order to equalize the outputs of ambient light components made during the light emission and non-emission periods (that is, subtraction of these outputs leaves outputs of auxiliary light components only).

Subsequently, the ambient light processing is carried out at step #218.

At step #218, B1-Bn are derived from subtracting the data P(1)-P(n) of this non-emission period from A1-An calculated at step #212.

This step is followed by step #219 for comparing the difference between a maximum Bn value and a minimum Bn value with a reference value. When the difference is equal to or greater than the reference value, it is considered that a sufficient contrast is obtained for enabling the focus detection, and the program moves to step #207 for carrying out the focus detecting operation. If the difference between the maximum and minimum Bn values is less than the reference value, step #220 is executed for comparing the number N of loops having been taken with a constant J. When the number N of loops reaches the constant J, no further process is pursued but the focus detecting operation is carried out (step #207). When the number N is less than the constant J, the program increments "1" to the number N at step #221, sets the flag "ALS on" at step #222, and moves to step #204 to continue with a next loop.

The limit is set at step #220 to the number of loops taken, in order to cope with the situation where a photographic object is at a very remote position and the same data are obtained at the auxiliary light emission and non-emission times. In such a case, an effective contrast does not result from the ambient light processing and, without the limit, it would be impossible for the program to stop repeating the same loop.

The described adding and ambient light processes realize an effective contrast for enabling the focus detection.

The description has been made of the TTL focus detection with the focus detecting sensors such as CCDs are disposed rearwardly of the objective lens. However, this embodiment is applicable also where the focus detecting sensors are disposed separately from the objective lens.

The characteristic feature of this embodiment resides in that the focus detecting modes are switchable and the auxiliary illumination is controllable in response to which of the three, i.e. high, intermediate and low luminance regions a photographic object is in. When the object is in the intermediate luminance level, the auxiliary illumination is repeatedly turned on and off. The auxiliary light components are extracted by determining the difference between the outputs of auxiliary illumination times and the outputs of non-illumination times. This feature enables satisfactory focus detection even in a luminance region where the auxiliary light components have only a small proportion in the amount of light received at the time of auxiliary illumination.

A different focus detecting device will be described next, which device comprises a first auxiliary light emitter including a group of light emitting diodes 154' and a second auxiliary light emitter including a group of light emitting diodes 105'.

Figure 25:
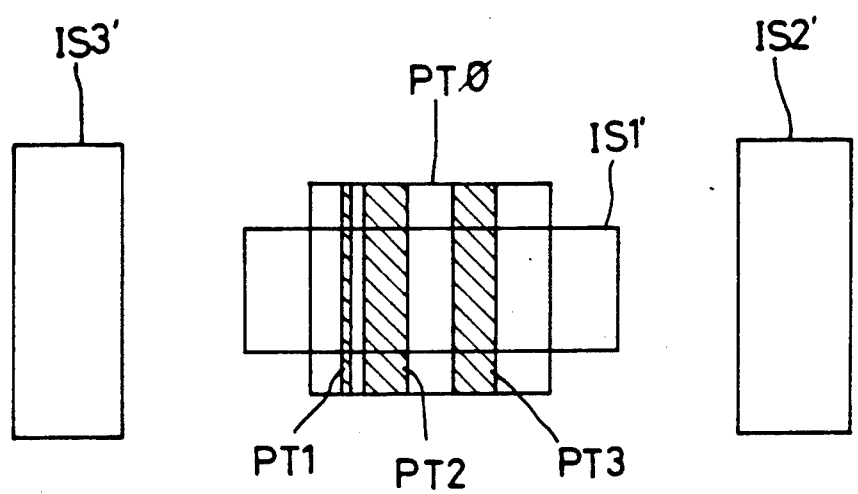

FIG. 25 shows patterns of light projected from these light emitting diodes. The second light emitter 105' projects light patterns by means of varied luminances of the diodes or by including slit patterns (acting as opaque elements) formed by vapor deposition on surfaces of the diodes. The luminance contrast of the light patterns is utilized for focus detection when a photographic object lacks in sufficient contrast. The second light emitter 105' illuminates the object with a single light beam since a spot illumination centrally of a frame picked up will serve the purpose. FIG. 25 shows this spot illumination wherein shaded portions PT1-PT3 representing low luminance portions (i.e. dark parts) lie on a high luminance region PT0, thereby forming a projected pattern having a sideways contrast. A construction is devised to receive light reflected from this light pattern only in a central focus detecting range of the frame, which is hereinafter referred to as the first island IS1'. In this embodiment, two vertically elongate areas are also provided as opposed to each other across the first island IS1', which are hereinafter referred to as the second and third islands IS2' and IS3'. Light reflected from one of these islands (i.e. ambient light) is received during the focus detection. As evident from FIG. 25, the light pattern reflected from the sideways elongate first island IS1' has a sideways contrast for enabling focus detection based on detection of phase differences.

Although not shown, the light pattern projected from the second light emitter 105' may also have a vertical contrast, for example, with an upper half of high luminance and a lower half of low luminance. This additional feature will assure an effective luminance of a distant object as compared with a nearby object.

The first light emitter 154' is used mainly when the object lacks in luminance, and must therefore illuminate a relatively large area of the frame to be picked up. Thus, as distinct from the second light emitter 105', the first light emitter 154' projects three light beams which are received by the first to third islands. The first light emitter 154' may project patterned light in the same manner as does the second light emitter 105' or by including a pattern seal applied to a front face thereof, in order to provide a contrast at the same time. In this case, a sideways light pattern is projected to the first island IS1' and a vertical light pattern to each of the second and third islands IS2' and IS3'.

One example of such pattern formation is illustrated in FIG. 7B. More particularly, the three light emitting diodes acting as light sources contained in a flash unit project light beams through a projection pattern film and a projecting lens for illuminating an object as shown in FIG. 7B.

The projection pattern film includes a random arrangement of horizontal stripes at each side, and a random arrangement of vertical stripes at the center, thereby producing an effective contrast in each of the three focus detecting areas IS1'-IS3'. In other words, the focus detection is effected by means of a sideways contrast in the central first island IS1' and a vertical contrast in each of the lateral second and third islands IS2' and IS3'.

As in the case of the second light emitter 105', each light pattern projected from the first light emitter 154' may also have luminance variations in the direction perpendicular to the direction of each contrast, which will assure an effective luminance of a distant object as compared with a nearby object.

Figure 26:
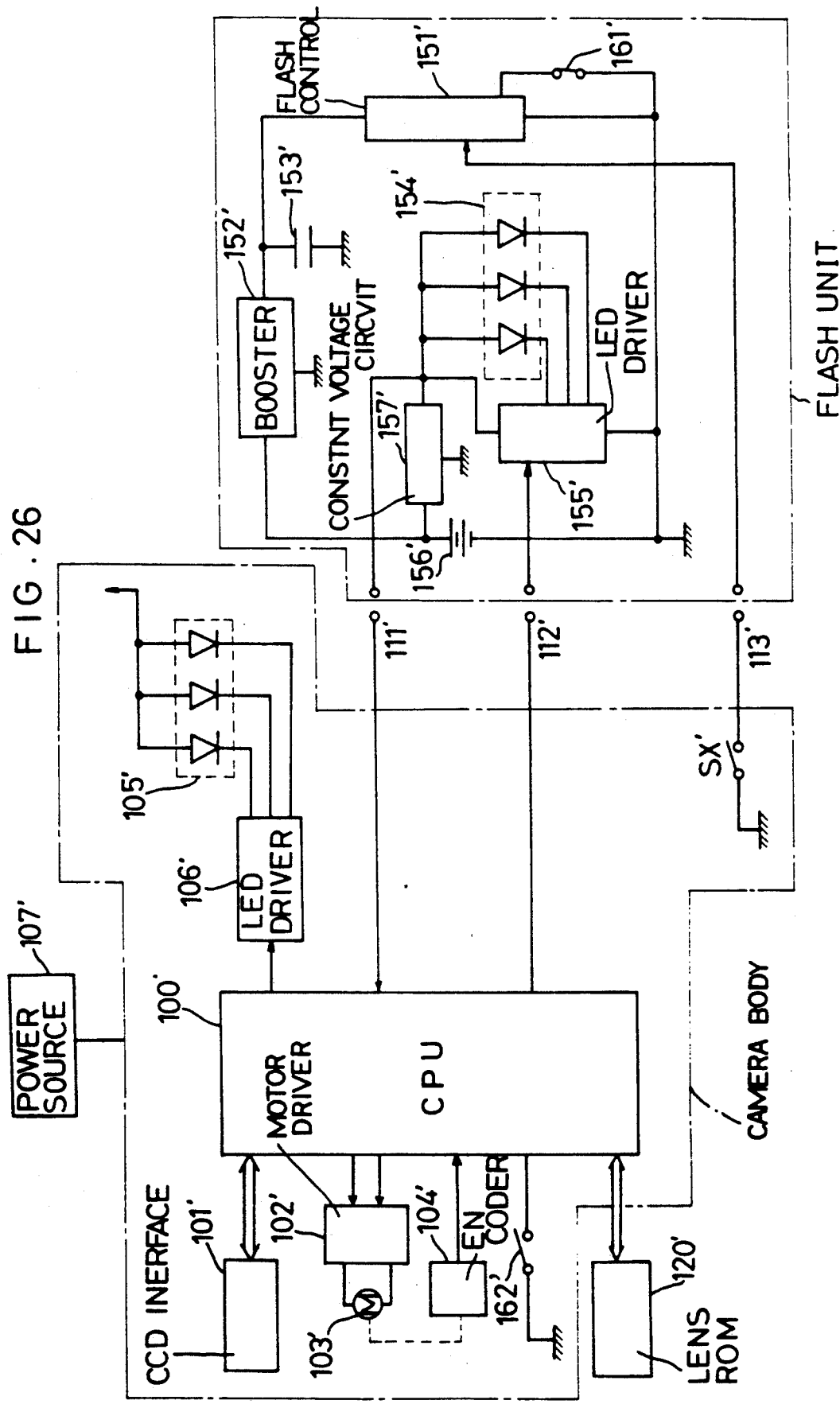

FIG. 26 schematically shows a control circuitry of this focus detecting device, which corresponds to FIG. 15.

Reference 100' denotes a CPU which controls an overall sequence of the entire camera and carries out various arithmetic operations. Reference 101' denotes a CCD interface included in the focus detecting device for converting signals provided by an array of CCD elements, for example, into serial digital data for output to the CPU 100'. The CPU 100' transmits various control signals through the CCD interface 101' to the CCD elements for starting and ending light reception and for removing residual electric charges from the CCD elements immediately before starting the light reception.

Reference 103' denotes a motor for driving the objective lens to an in-focus position. Reference 102' denotes a motor drive circuit for actuating the motor 103'. Reference 104' denotes an encoder for outputting an amount of movement of the objective lens as converted into pulses. In response to the signals from the CCD elements, the CPU 100' calculates the in-focus position and outputs instructions to the motor drive circuit 102' for driving the motor 103' toward an in-focus position. The motor 103' is driven until the amount of lens movement detected by the encoder 104' agrees with the result of the calculation made by the CPU 100'. Reference 162' denotes an autofocus switch which is operable when a shutter release button, not shown, is half-pressed, for starting an automatic focus detecting operation.

Reference 105' denotes the second light emitter which includes three elements, for example, formed into an integral unit for providing vertical luminance variations as described with reference to FIG. 25. Reference 106' denotes an LED drive circuit for controlling light emission and non-emission of the second light emitter 105'. Reference 107' denotes a power source for supplying power to actuate the motor 103' and various circuits mounted in the camera body.

Next, the portion of the circuitry included in the flash unit will be described. Reference 156' denotes a power source provided for the flash unit portion of the circuitry. Reference 157' denotes a constant voltage generating circuit for receiving voltage from the power source 146' and generating a constant voltage, so that the first light emitter 154' has constant luminance at all times. Reference 155' denotes an LED drive circuit connected to a terminal 112' in the camera body for controlling power supply to the first light emitter 154' and switching between the light emission and the non-emission thereof.

Reference 152' denotes a booster circuit for boosting the source voltage for flashing. Reference 153' denotes a charging capacitor for storing energy for the flashing. Reference 151' denotes a flash control circuit for causing a flash in response to a signal received from a terminal 113' in the camera body. A switch SX' is automatically closed when the camera body needs a flash. Details of this switch are irrelevant to the present invention, and are therefore not described herein. Reference 161' denotes a switch for rendering the flash control circuit 151' inoperative, which allows the user to deliberately put the flash unit out of use. The mounting of the flash unit is communicated to the camera body through a terminal 111' in the camera body.

Reference 120' denotes a lens ROM incorporated into an objective lens, which stores data characteristic of the lens such as an amount of lens movement along its optical axis per rotation of the motor 103'.

Figure 27:
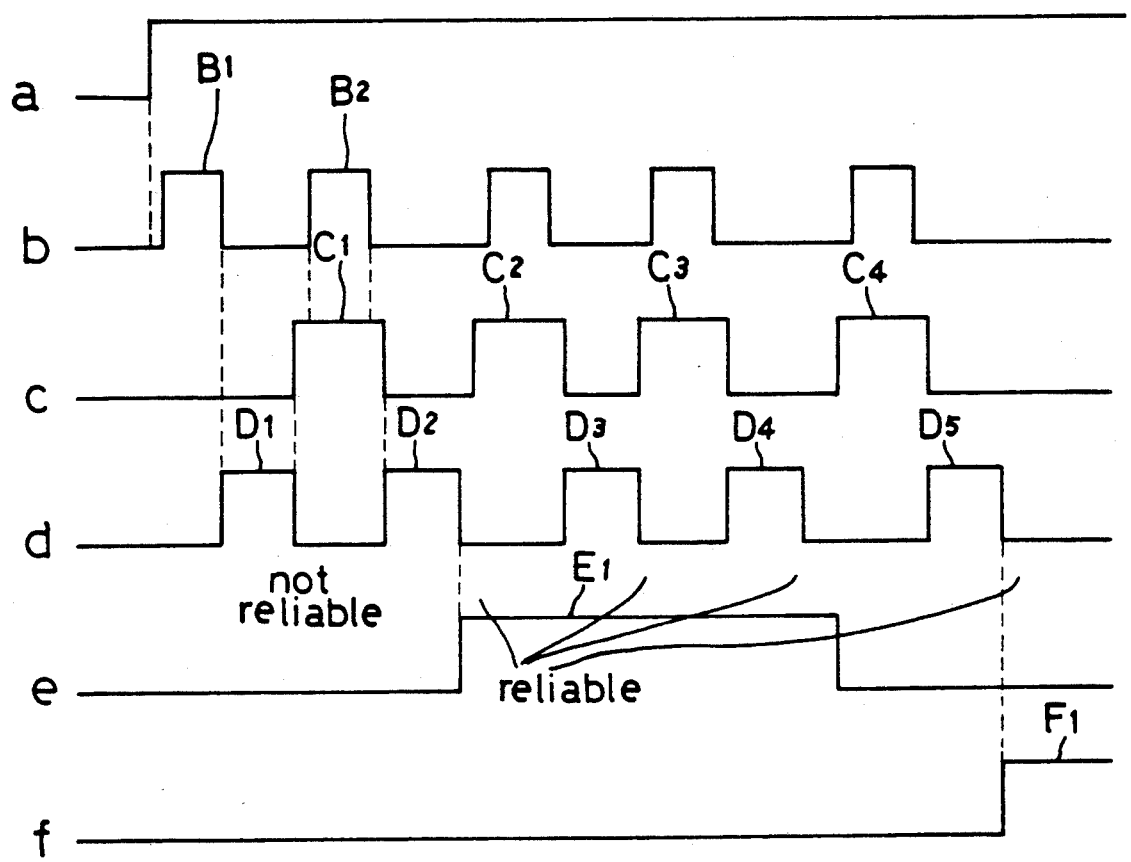
Figure 28:
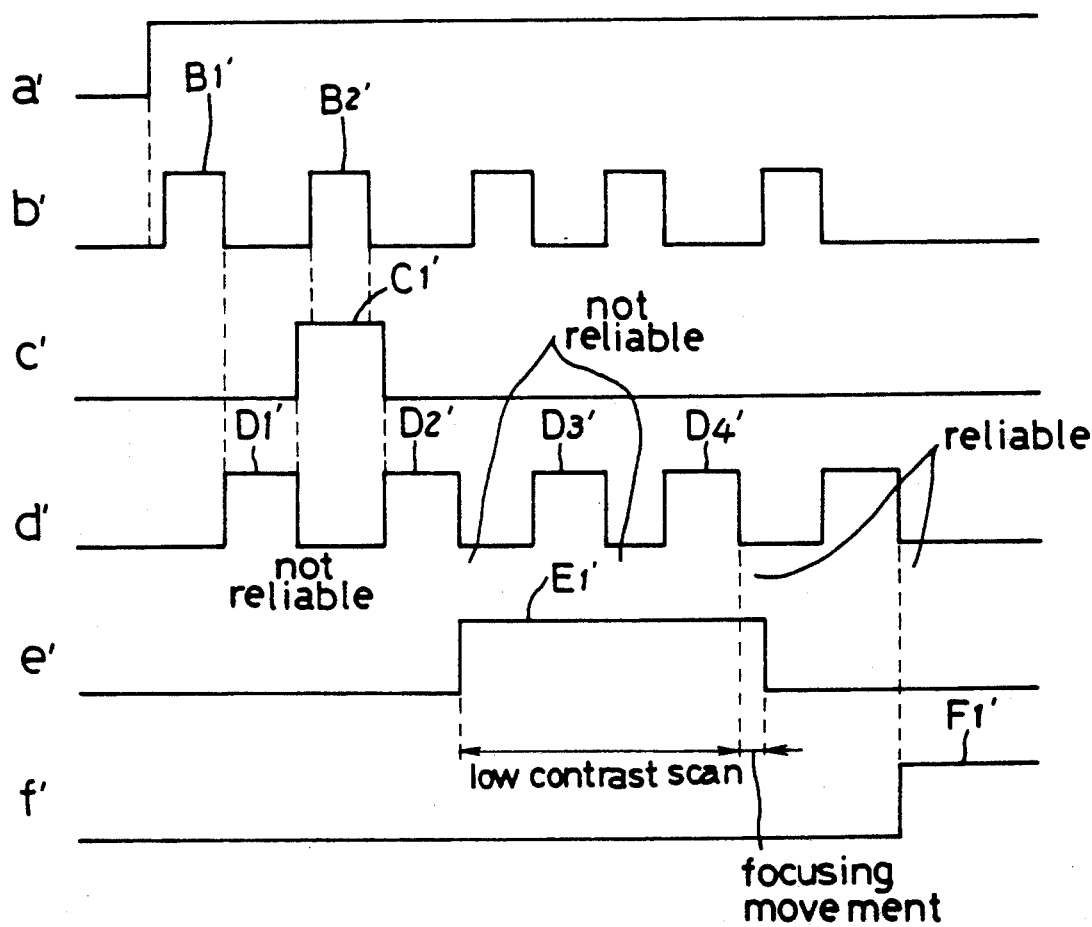

FIGS. 27 and 28 are time charts for illustrating operations of this embodiment. FIG. 27 shows a process of focus detection from ambient light to light emission from the first light emitter 154'. FIG. 28 shows a focusing process following several focus detecting operations using the auxiliary light. In these drawings, signal a represents on/off operations of the autofocus switch 102', signal b represents the light reception and integration by the CCD array, signal c represents light emission from the first light emitter 154', signal d represents the focus detecting operation and amount of movement calculation carried out by CPU 100', signal e represents the lens movement toward an in-focus position, and signal f represents a focusing state. The above operations take place when the signals are in high level and do not take place when the signals are in low level. Details of the operations will be described hereinafter with reference to flow charts.

The focus detecting operation will be described with reference to FIGS. 29A through 29E showing the flow charts.

The following description of the flow charts comprises three parts, i.e. a first mode relating to focus detection based on ambient light, a second mode relating to focus detection based on the auxiliary light provided by the second light emitter 105', and a third mode relating to focus detection based on the auxiliary light provided by the first light emitter 154'.

First Mode

When the shutter release switch is half-pressed, the autofocus switch 102' is turned on at step #301 and initialization such as removal of residual electric charges from the CCDs is effected at step #302. The CPU 100' reads the data characteristic of the objective lens at step #304. Ambient light received through the objective lens is integrated by the CCDs at step #305. When a predetermined amount of light is received, the integrated light signal of the CCDs is digitalized and arranged into serial data by trhe interface 101', which are input to the CPU 100' (steps #306 and #307). Since this is a first focus detecting operation (steps #308 and #309) which is based on ambient light ("No" at step #310) and the objective lens is not driven ("No" at step #311), the program moves to step #314 for carrying out a focus detecting calculation for the first island first. Since this calculation is based on ambient light ("No" at step #315), calculation for the second and third islands are carried out successively at steps #316 and #317. Although not included in the flow chart, the CPU 100' selects, for use as focus finding data, the data relating to the first island or the most reliable data from among the data relating to the three islands.

Since the objective lens is not driven for the first focus detection ("No" at step #318), the program jumps to step #322. If the results of the above focus detecting calculation are found at step #322 to include at least one reliable result, an amount of defocus is obtained at step #323. The amount of defocus means an amount of deviation of a current lens position from an in-focus position in terms of focus detecting calculation.

Since the objective lens is not driven ("No" at step #324), judgment is made at step #327 whether the lens is in the in-focus position or not. If it is, a display is made to effect in a finder, not shown, at step #329, and the focus detecting operation comes to end at step #330.

If the lens is not in the in-focus position ("No" at step #327), an amount of lens movement is derived from the result of focus detecting calculation and the lens data read at step #304, and the objective lens is driven (steps #331 and #332). If the amount of lens movement is less than a predetermined amount ("No" at step #333), a succeeding focus detecting operation (second detecting opeation) is withheld until the lens driving operation by predetermined amount is completed (steps #334 and #335). Conversely, when the amount of lens movement is greater than the predetermined amount ("Yes" at step #333), the following steps are taken even during the lens movement. Since detection values are obtained under ambient light ("Yes" at step #336), a second detecting operation is carried out with ambient light (steps #303 and #305). The second detecting operation is the same as the first detecting operation up to step #310. Since step #311 finds that the objective lens is in movement, judgment is made at step #312 whether a low contrast scan is on or not. The low contrast scan means a predetermined lens movement effected when no focus detection has been obtained. In this case, generally, the lens is forcibly moved toward an infinite end photographing position or a closest end photographing position while effecting focus detection.

Since calculation results were obtained through the first focus detection, the lens is not taking the low contrast scan ("No" at step #312) but is moving toward an in-focus position. In the second detecting operation, focus detection is not carried out with respect to all the islands but instead a speedy calculation is carried out with respect to a particular island, namely the first island or the same island that was employed at the preveious time as the most reliable.

Then the program moves to step #322 regardless of whether the lens movement has completed or not. Since the second detecting operation is the same as the first, reliable results are normally regarded as having been obtained ("Yes" at in step #322, and step #323). If the lens movement has already been completed by this time, judgment is made through comparison between the current position of the lens and the results of the second focus detection whether the lens is in the in-focus position or not, and normally the lens is in the in-focus position (steps #327, #329 and #330). If the lens movement has not been completed ("Yes" at step #324), a new in-focus position is derived from the results of the second focus detection and the lens position at the time of CCD integration (steps #325, #326 and #328). In this case, a third focus detection is carried out in the same way as the second focus detection, for the sake of confirmation of in-focus state, and ultimately the in-focus display will be made at step #330.

In the first mode, the results of the calculation may be judged unreliable ("No" at step #322). This takes place when the lens position is so remote from the in-focus position that no contrast is available because of in a very poor image-forming condition.

Figure 29A:
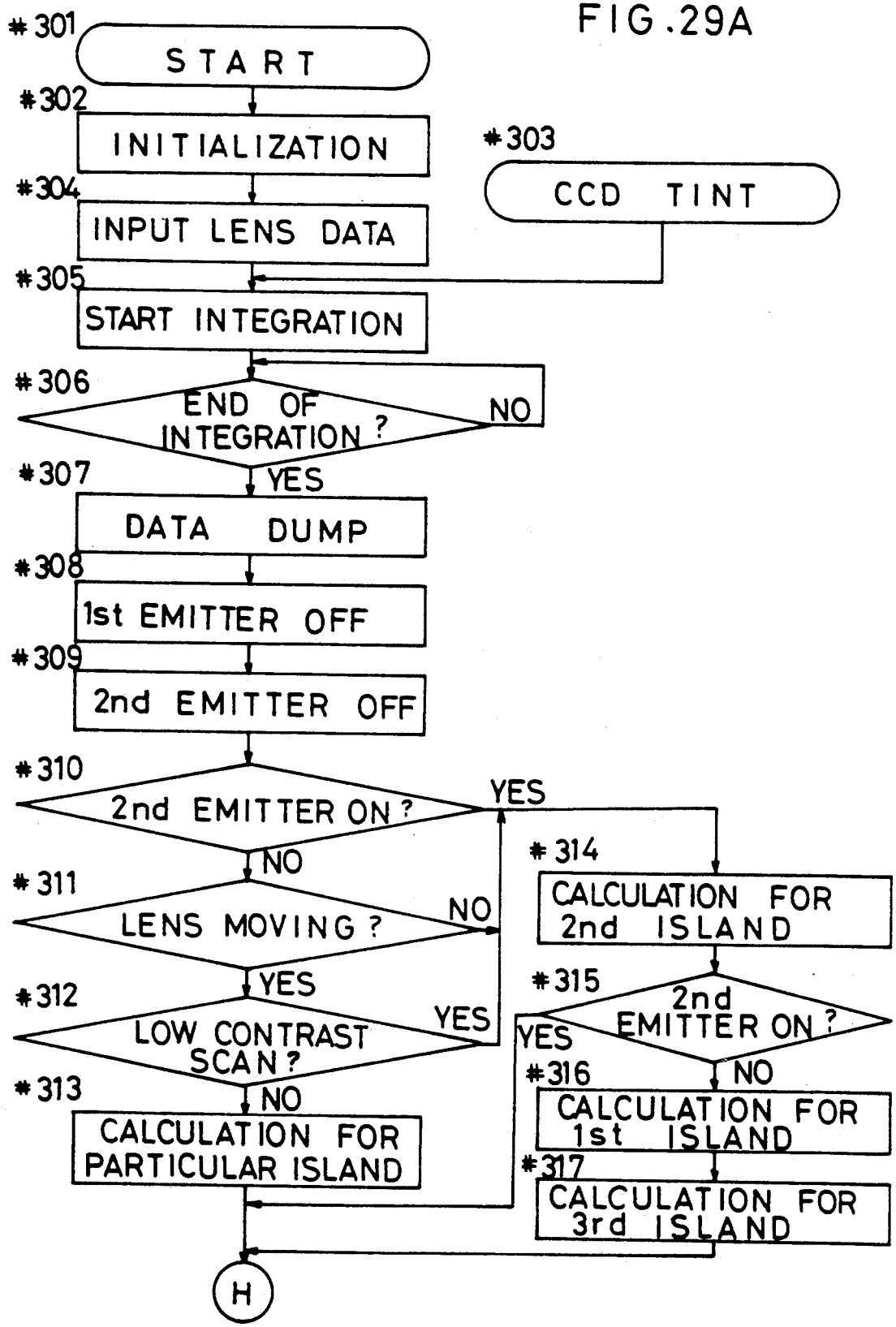
FIGS. 29A through 29E are flow charts illustrating the focus detecting operation.
Figure 29B:
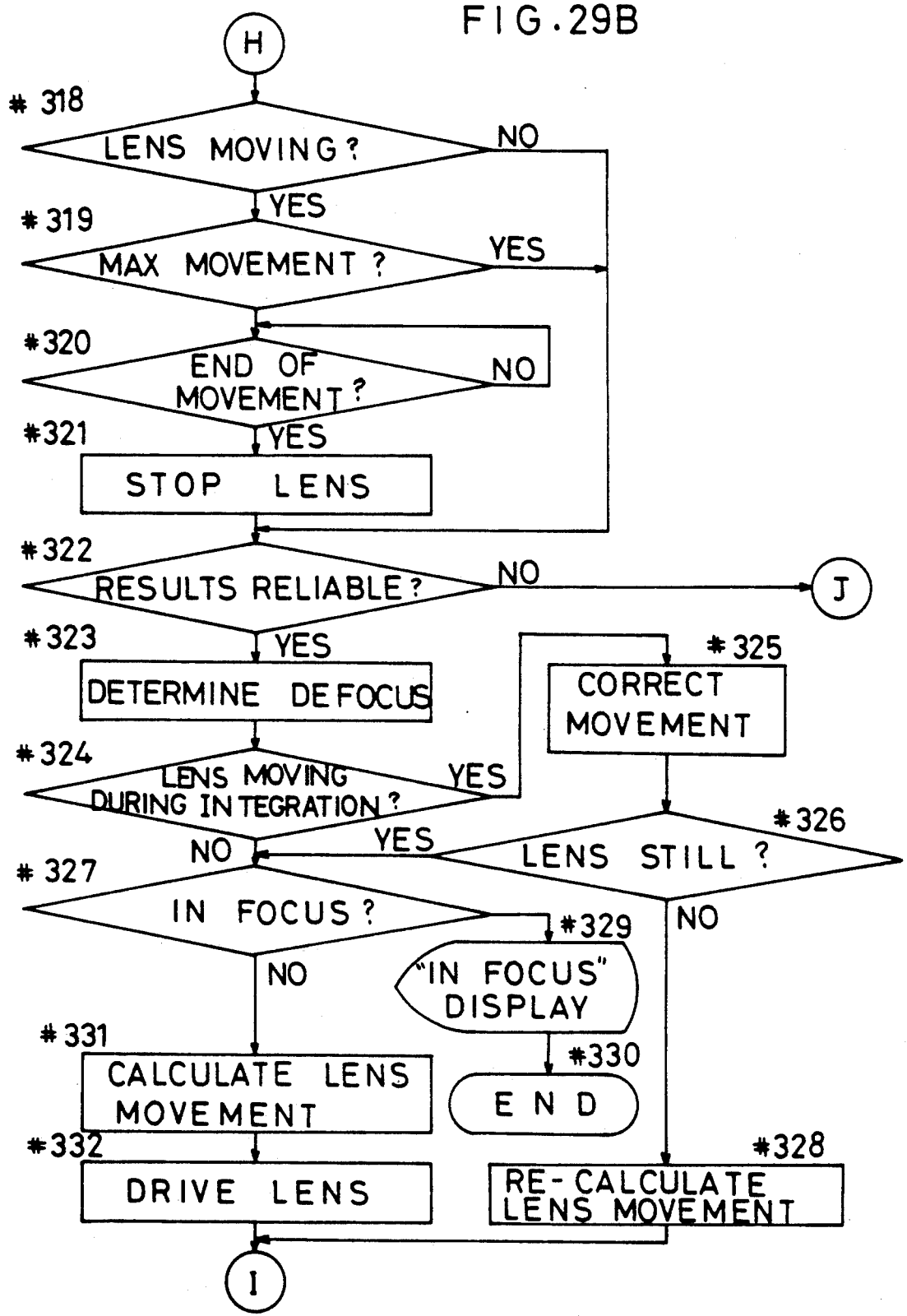
Figure 29C:
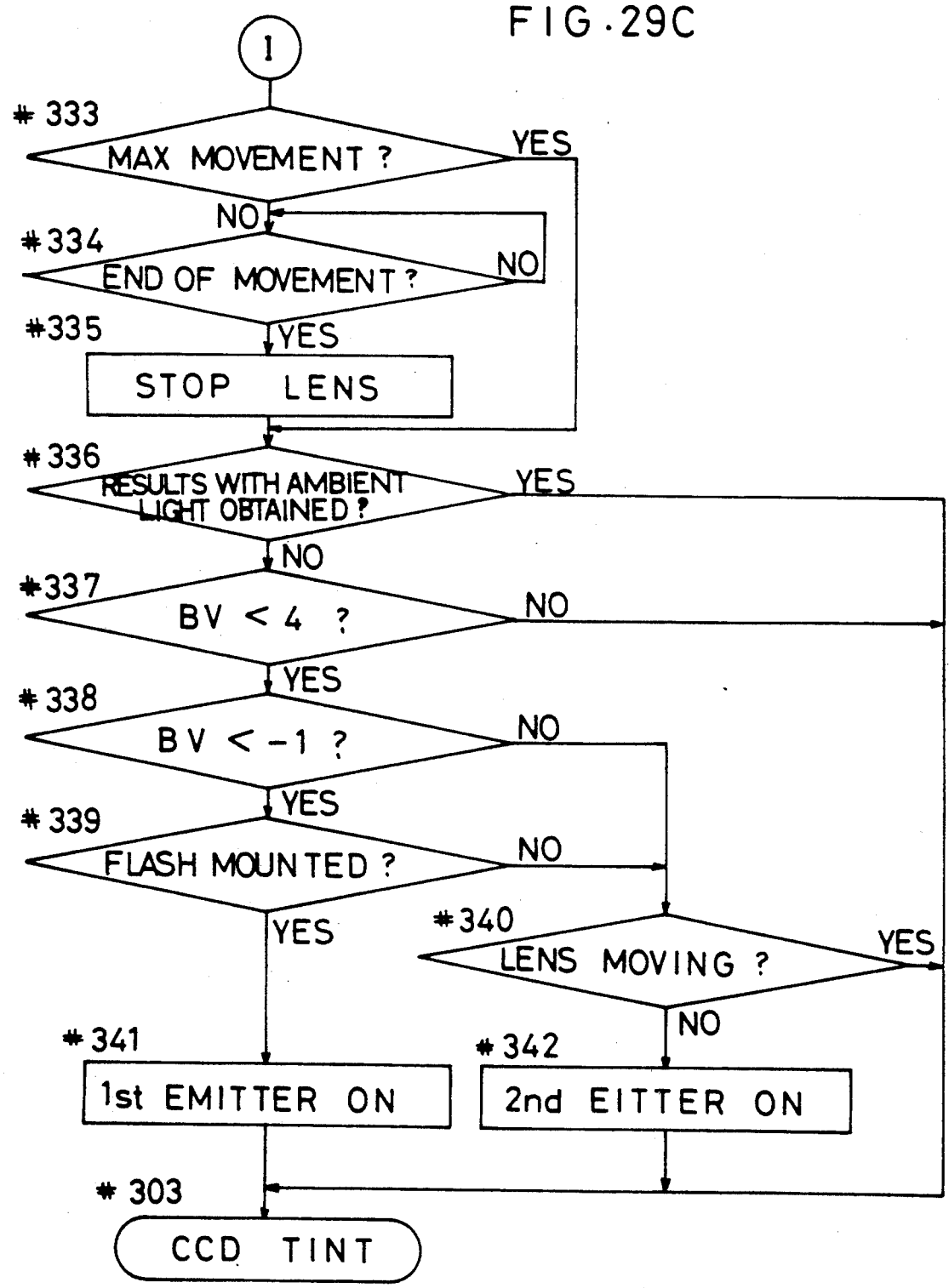
Figure 29D:
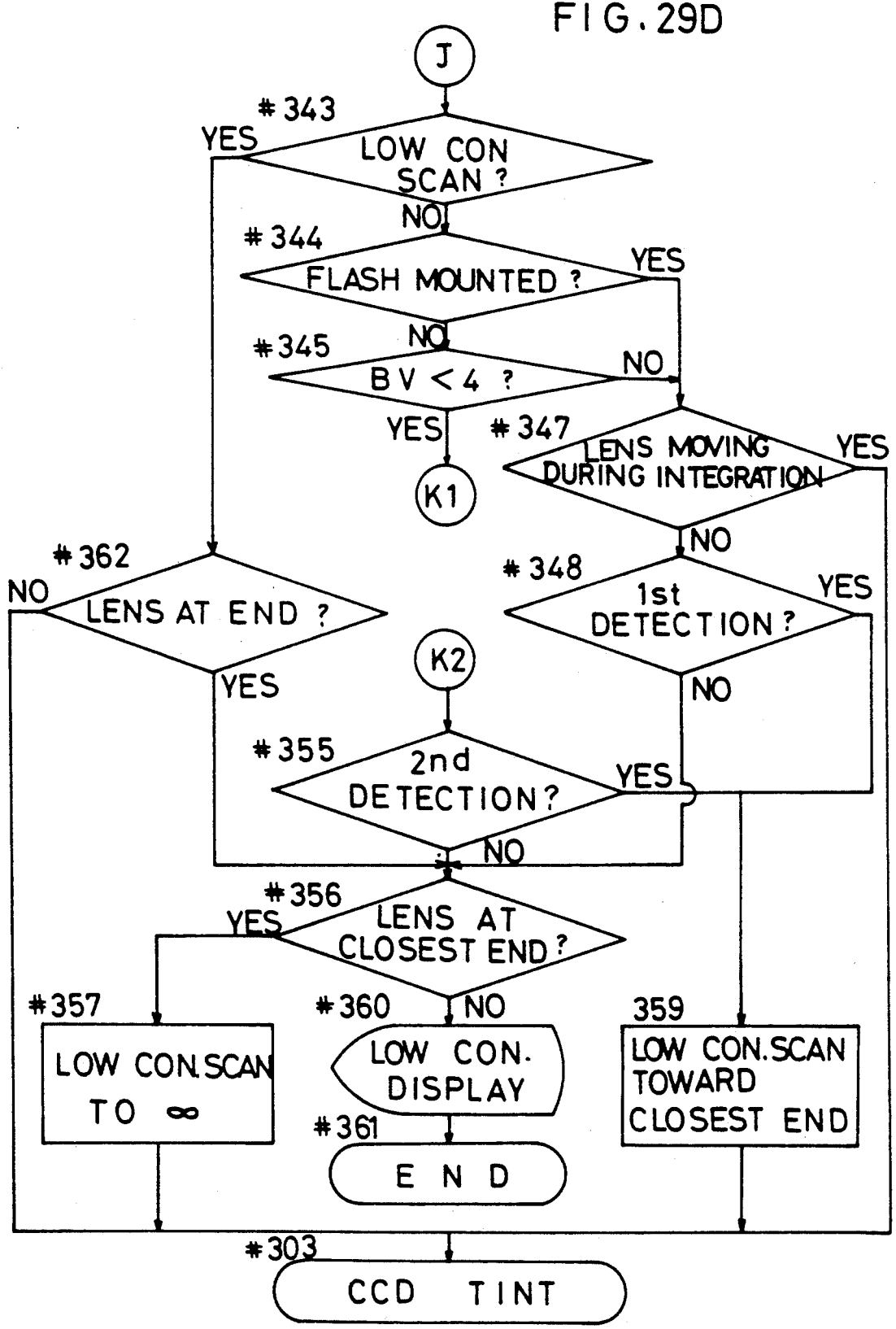
Figure 29E:
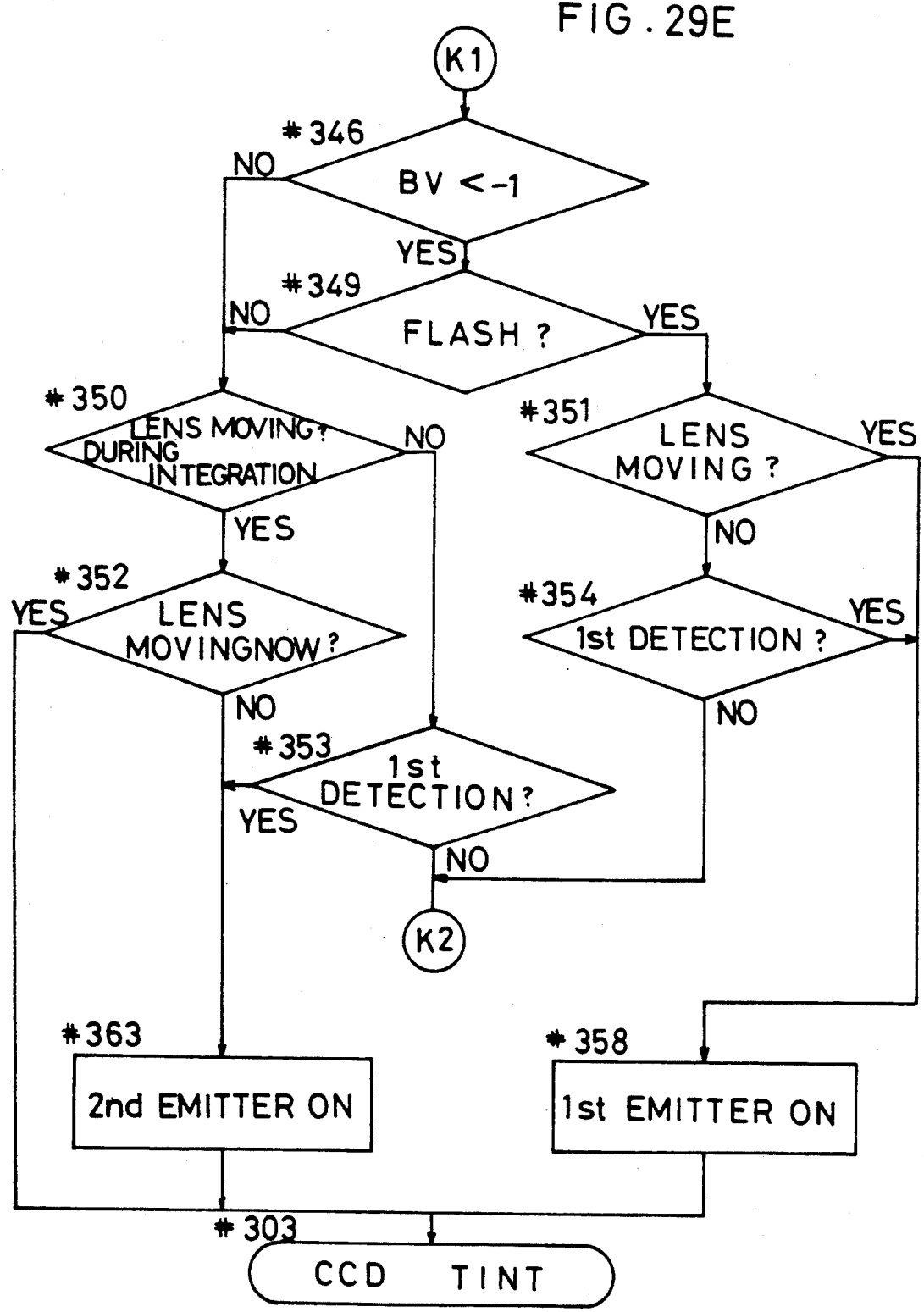

In this case, the program moves to the flow chart of FIG. 29D. Since it is not a low contrast scan and the results of the first operation are not availabe ("No" at at steps #343 and #344), judgment is made at step #345 whether the luminance of the object was greater than 4 or not.

It is to be noted here that the second mode is used when the luminance of the object Bv is between −1 and 4 which is somewhat dark, and that the third mode is used when the luminance of the object Bv is less than −1 which is totally insufficient.

In the first mode, the luminance of the object is greater than 4 ("No" at step #345), and the program moves to step #348 if the lens is not in movement. If this is a first focus detection, the lens is forcibly moved toward the closest end photographing position ("Yes" at step #348, and step #359) for effecting a second focus detection under ambient light.

Normally, an in-focus state is attained by achieving reliability at step #322 during the low contrast scan. Otherwise, if the lens is already at the closest end photographing position, the lens is forcibly driven toward the infinite end photographing position during the second and subsequent focus detecting operation ("No" at step #348, "Yes" at step #356, and step #357) to continue the focus detection under ambient light. When the lens returns to the infinite end photographing position after one complete reciprocation without attaining the in-focus state, it is determined that reliable focus detection results are unavailable, a low contrast display is made and photo-taking is prohibited (step #361, "No" at step #356, and step #360).

Second Mode

The second mode is the same as the first mode insofar as the initial focus detection is based on ambient light. The program proceeds to the second mode when the results of the calculation are judged unreliable at step #322 and the luminance of the object is judged less than 4 and equal to or greater than −1 at steps #345 and

346. In other words, the second mode is employed mainly when reliable results of focus detection are impossible because of insufficient luminance for giving a contrast to the photographic object. Since the lens is not driven during the first focus detection ("No" at step #350 and "Yes" at step #353), the second light emitter 105' is turned on at step #363. Thus, in the second focus detection, the array of CCD elements receives and integrates auxiliary light beams reflected from the object at steps #305 and #306. The second light emitter 105' is turned off upon lapse of a predetermined time at step #308. Then, an operation is carried out on the basis of focus detection with respect to the first island, and judgment is made as to the reliability of the results ("Yes" at step #310, step #314, "Yes" at step #315, and steps #318-#322). If the results are found reliable at step #322, a focusing operation is carried out through steps #327 and #329, or a next mode is started (steps #332-#337, and "No" at step #338). If the lens is standing still at this time, a focus detection is effected again for confirmation purposes ("No" at step #340), to ultimately achieve the in-focus state. Conversely, if the lens is moving ("Yes" at step #333), the second light emitter 105' is not turned on ("Yes" at step #340) and a third focus detection based on ambient light is carried out. In this case, the program moves to step #350 since the results of calculation normally are not reliable ("No" at step #322), the low contrast scan is not being made, and the luminance of the object is between −1 and 4 ("No" at steps #343 and #346). If the lens is moving during the CCD integration ("Yes" at step #350) and is still moving at present ("Yes" at step #352), a fourth focus detection based on ambient light is carried out, and this operation is repeated until the lens stops. When the lens stops subsequently ("No" at step #352), it is assumed that the lens has moved to a position determined by reliable results obtained from the second focus detection. At step #363, the second light emitter 105' is turned on to effect focus detection for confirmation purposes, whereby the in-focus state normally is attained. Supposing that the results of this confirmation are judged unreliable at step #322, the program moves to step #350 at which the lens is at a standstill, then through steps #353, #355 and #356 for giving a low contrast display since an in-focus state is impossible, and to step #361 for prohibiting phototaking.

When reliable results are not obtained by turning on the second light emitter the second time, the program moves to step #346 since no low contrast scan is made at this time and reliable results were not obtained from the first time ("No" at steps #343 and #344). The program moves on to step #350 since the luminance of the object is between −1 and 4. Further, since the lens is standing still and this is the second focus detection ("No" at step #353 and "Yes" at step #355), a low contrast scan is started toward the closest end photographing position at step #359. It is not the question of luminance but the question of contrast that reliable focus detection results are not obtained from the use of auxiliary light. Thus, the lens is moved extensively in search of a position that picks up a proper contrast. The third focus detection is based on ambient light since it is carried out immediately after the low contrast scan ("Yes" at step #343 and "No" at step #362). As in the first mode, the lens makes one reciprocation ("Yes" at steps #343, #362 and #356, and step #357). If an in-focus state is not attained meanwhile, photo-taking is prohibited in the end ("Yes" at step #362 and "No" at step #356, and step #360).

Third Mode

As described in relation to the first mode, when the shutter release switch is half-pressed, the autofocus switch 162' is turned on at step #301 as represented by signals a and a' in FIGS. 27 and 28, and the CCDs receive and integrate ambient light from the photographic object for a predetermined time as represented by signals B1 and B1' (steps #301-#306). When the integration is completed, a focus detecting calculation is carried out with respect to each island at the first half of signals D1 and D1'. As in the case of the first mode, the program then moves to step #322 for judging whether the results of the operations are reliable or not.

It is assumed that, in this mode, the results are unreliable, and that the program moves through step #343 up to step #349. If this step finds that the flash unit is not mounted, the program executes the second mode. It is assumed here that the flash unit is mounted ("Yes" at step #349). Since this is a first focus detection ("No" at step #351 and "Yes" at step #354), the first light emitter 154' is turned on at step #358 (second half of signals D1 and D1'). As a result, the first light emitter 154' emits light for a predetermined time as represented by signals C1 and C1'. Since the first light emitter 154' has the power source 156' different from that of the camera body, the emission time may be approximately the same as the case of ambient light and the emission time of the second light emitter 105'. By shortening the emission time, the integration by the CCDs may be carried out in a correspondingly short time. This diminishes errors due to the lens movement during the integration, thereby promoting focus detecting precision and reducing the time required for the focus detection.

In the second focus detection, the CCDs receive and integrate the light of the first light emitter 154' reflected from the object (signals B2 and B2'), and the resulting data are processed in the same manner as in the first focus detection (steps #303-#309-#322).

If the results obtained by processing the signal D2 are found reliable at step #322 (FIG. 27), an in-focus state is attained at step #329 or the lens is driven at step #332 after the lens is found standing still at step #324. When an in-focus state is not attained, the lens is moved as represented by signal E1 and the program moves through step #339 to step #341 for turning on the first light emitter 154'. The light emitter 154' is turned on as represented by signal C2 when step #333 finds the amount of lens movement to be greater than the predetermined amount, namely even if the lens is being driven. Thereafter, a third and a fourth focus detecting operations are similarly carried out (signals C3, C4, D3 and D4), accompanying the light emission from the first emitter 154' despite the lens movement. When an in-focus state is attained (step #329), the lens is stopped as represented by the rear end of signal E1, a focus detection is carried out for confirmation (signal D), and an in-focus signal as at F1 is output for allowing picture-taking.

When the results obtained from the second focus detection are found unreliable at step #322 (signal D2' in FIG. 28), a next process is carried out since this is not the question of auxiliary light, namely not due to lack of luminance. In this case, the program moves through step #343 to step #354. Since this is a second focus detection ("No" at step #354 and "Yes" at step #355), a low contrast scan is forcibly effected toward the closest end photographing position as represented by signal E1' (step #359). Thus, the third and fourth focus detections are carried out without light emission from the first light emitter 154' (signals D3' and E4'). The low contrast scan continues from step #343 to step #362 and, after the lens reaches the closeup end photographing position at step #356, is reversed toward the infinite end (step #357). If focus detection results are judged unreliable still, step #362 finds arrival of the lens at the infinite end photographing position, and step #356 confirms that the lens has been reciprocated for the low contrast scan. Thereafter a low contrast display is given at step #360 and photo-taking is prohibited at step #361.

The operations are carried out in the three modes as described above.

According to the present invention, the power source for the first light emitter 154' is mounted in the flash unit. This power source may, however, be included in the camera body to be connected to the first light emitter 154' when the flash unit is attached to the camera body.

The first light emitter 154' itself may be mounted in the camera body.

Further, while the light emitters 105' and 154' in this embodiment have partially different applications, they may be intended for the same purpose of compensating for insufficient luminance. In this case, priority may be afforded to the light emitter 154' when the flash unit is attached, the light emitter 105' being used when the flash unit is removed. More particularly, the CPU 100' may detect presence or absence of the flash unit and, when the flash unit is attached to the camera body, switch from the second mode utilizing the light emitter 105' to the third mode utilizing the light emitter 154' (which is operable even when the objective lens is moving).

Other embodiments of the present invention are listed hereinafter.

In the first embodiment, the first light emitter 4A is included in the flash unit 3 and second light emitter 4B in the camera body 1. However, the first light emitter 4A may be included in the camera body 1 and second light emitter 4B in the flash unit 3, or both light emitters 4A and 4B may be including in either the camera body 1 or the flash unit 3. In the latter case, instead of the two light emitters 4A and 4B having completely separate constructions as in the first embodiment, a whole auxiliary light emitting device 4 having a light source, a fixed lens, and a movable lens movable into and out of an optical path may be provided to function as the first light emitter 4A with the movable lens retracted from the optical path and as the second light emitter 4B with the movable lens placed in the optical path. Alternatively, such a light emitting device 4 may include a light source and a projecting lens movable along a projecting optical axis between a position to function as the first light emitter 4A and a position to function as the second light emitter 4B. In this way, the two light emitters may share part of the construction.

In the first embodiment, the second light emitter 4B projects the second auxiliary light beam Lb to the projecting region having a fixed area, with its unit area intensity fixed. Instead, the second auxiliary light beam Lb may be condensable to varied degrees by moving the projecting lens 17 along the projecting optical axis Os2, thereby varying the projecting area and unit area intensity in plural steps or in a continuous, stepless way.

In the first embodiment, the CPU 100 acts as control means for selectively operating the two auxiliary light emitters 4A and 4B in response to the luminance of a photographic object. Instead, a manually operable switch or the like may be provided for selecting between the two light emitters 4A and 4B.

In the first embodiment, the focus detecting device X has a plurality of focus detecting regions IS1-IS3, and accordingly the first light emitter 4A is constructed to project contrasty images to these regions IS1-IS3, respectively. Instead, the first light emitter 4A may project the same contrasty image to all of these regions IS1-IS3. It is possible in this case to modify the focus detecting device X such that, for example, the three focus detecting regions IS1-IS3 extend in the same direction. Further, the focus detecting device X may carry out focus detecting operations by using light beams received from objects lying in a single focus detecting region.

In the first embodiment, the second light emitter 4B is manually movable to vary the second light beam projecting direction vertically and horizontally. Instead, the projecting direction may be varied by motor drive, or may be varied either vertically or horizontally by changing the positional relationship between the second light emitter 4B and objective lens 2. The projecting direction may be adjustable only at the manufacturing stage, omitting the feature of allowing the user to vary the projecting direction. Further, the second light emitter 4B may project the second auxiliary light beam Lb in a fixed direction although it will result in a reduced range for enabling focus detection.

Figure 30:
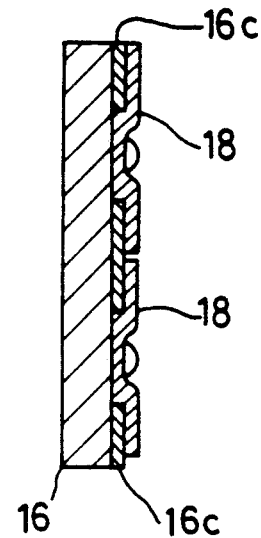
Figure 31:
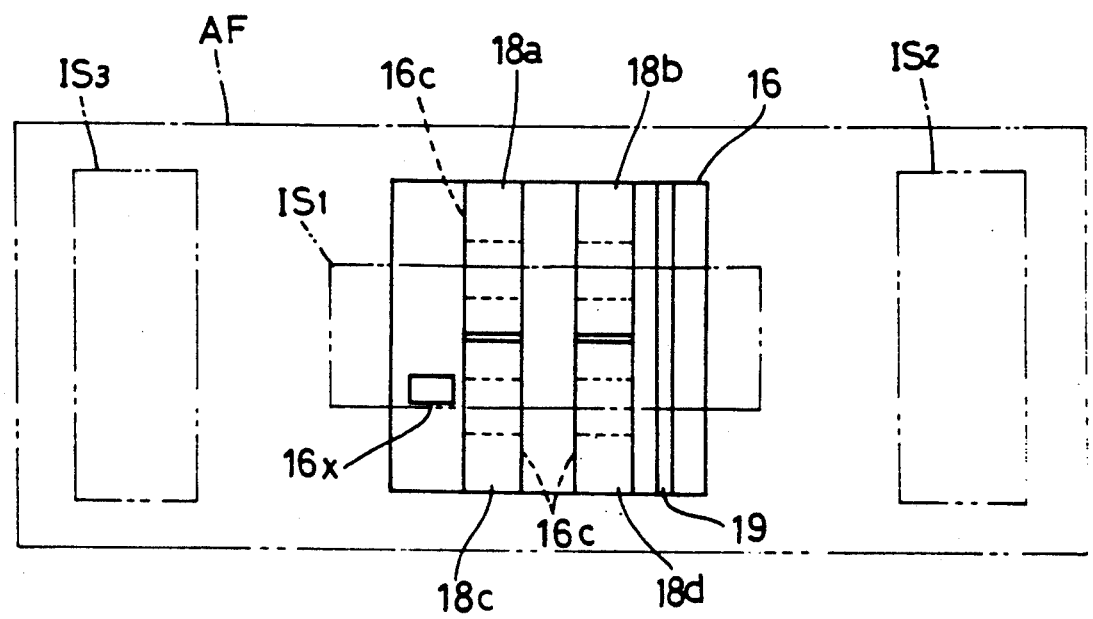

The first and second auxiliary light emitters 4A and 4B are variable as desired with regard to the construction for defining the auxiliary light beams. In the second light emitter 4B, for example, a film printed with patterns may be disposed between the LED pellet 16 and projecting lens 17 as in the first light emitter 4A, instead of forming the projecting pattern 16b on the LED pellet 16. Further, the LED pellet 16 may provide the same emission intensity throughout. The projecting pattern 16b may be formed on the LED pellet 16 as shown in FIG. 30. In this example, the metal layer 19 is dispensed with and the projecting pattern 16b is defined only by electrodes 18a, with layers of silicon dioxide 16c acting to prevent interference between the electrodes 18a. FIG. 31 shows the projecting pattern 16b resulting from the construction of FIG. 30. In this pattern 16b, the vertical line on which opaque metal layer 19 is formed by vapor deposition at the righthand side is added to increase a vertical contrast.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A focus detecting device utilizing auxiliary illumination light, comprising:
   focus detecting means for detecting a focusing condition with respect to an object by utilizing an image of the object;

first auxiliary light projecting means for projecting a first auxiliary light toward said object;

second auxiliary light projecting means for projecting a second auxiliary light toward said object, said second auxiliary light being different in characteristics from said first auxiliary light; and selecting means for selecting between said first auxiliary light projecting means and said second auxiliary light projecting means in response to the brightness of said object.

2. A focus detecting device as claimed in claim 1, wherein said second auxiliary light projecting means illuminates a smaller region than said first auxiliary light projecting means.

3. An auxiliary light projecting apparatus for use with a focus detecting device of a camera for carrying out focus detection with respect to a photographic object based on light impinging on a focus detecting region, said auxiliary light projecting apparatus comprising:

first light projecting means for projecting a light covering a region corresponding to an entirety of said focus detecting region;

second light projecting means for projecting a condensed light covering a region corresponding to part of said focus detecting region; and control means for selectively actuating said first and second light projecting means in response to a state of said photographic object.

4. An auxiliary light projecting apparatus as claimed in claim 3, wherein said first light projecting means is mounted in an accessory removably attached to said camera body, and said second light projecting means is mounted in a camera body.

5. An auxiliary light projecting apparatus as claimed in claim 4, wherein said camera includes light measuring means for measuring brightness of the photographic object, said control means being operable to select said first light projecting means when said accessory is attached to said camera body and the brightness of the photographic object is below a predetermined level.

6. A focus detecting device of a camera comprising:
a focus detecting optical system;
light receiving means for receiving an image of a photographic object formed by said optical system;
an auxiliary light source for projecting a focus detecting auxiliary light onto said photographic object;
focus detecting means for detecting a focusing condition with reference to the photographic object selectively operable in one of the first, second and third modes,
focus detection in the first mode being based on outputs of said light receiving means with said light source turned off,
focus detection in the second mode being based on a difference between the outputs of said light receiving means with said light source turned off and then turned on, and
focus detection in the third mode being based on the outputs of said light receiving means with said light source turned on;
light measuring means for determining brightness of the photographic object to be in one of three ranges, i.e. a high brightness range above a first brightness level, an intermediate brightness range between the first brightness level and a second brightness level, and a low brightness range below the second brightness level; and control means for controlling said light source and said focus detecting means in response to results output from said light measuring means, said control means being operable for causing said focus detecting means to carry out the focus detection in the first mode with the light source turned off when the brightness of said photographic object is in the high brightness range, the second mode with the light source repeatedly turned on and off when the brightness of said photographic object is in the intermediate brightness range, and the third mode with the light source turned on when the brightness of said photographic object is in the low brightness range.

7. A focus detecting device as claimed in claim 6, wherein said control means is operable, when the brightness of said photographic object is in the intermediate brightness range, for causing said focus detecting means to carry out the focus detection based on a signal produced by adding the output difference the number of times corresponding to a level of the difference between the outputs of said light receiving means.

8. In a camera having a lens drive device and a focus detecting device utilizing auxiliary light, said focus detecting device comprising;

first auxiliary light projecting means having a different power source;

second auxiliary light projecting means sharing a power source with said lens drive device;

auxiliary light selecting means for selecting between said first auxiliary light projecting means and said second auxiliary light projecting means; and control means for controlling light emission from one of said first and second auxiliary light projecting means selected by said auxiliary light selecting means, said control means being operable, when said first auxiliary light projecting means is selected, for allowing light emission from said first auxiliary light projecting means even during the lens movement and, when said second auxiliary light projecting means is selected, for prohibiting light emission from said second auxiliary light projecting means during a lens movement.

9. A focus detecting device as claimed in claim 8, wherein said first auxiliary light projecting means is mounted in an accessory removably attached to said camera body, and said second auxiliary light projecting means is mounted in a camera body.

10. A focus detecting device as claimed in claim 9, wherein said camera includes light measuring means for measuring brightness of a photographic object, said control means being operable to select said first auxiliary light projecting means when said accessory is attached to said camera body and the brightness of the photographic object is below a predetermined level.

11. A focus detecting device having auxiliary illumination light, comprising:

focus detecting means for detecting a focusing condition with respect to an object by utilizing an image of the object;

first auxiliary light projecting means for projecting a first auxiliary light toward said object;

second auxiliary light projecting means for projecting a second auxiliary light toward said object, said second auxiliary light being different in characteristics from said first auxiliary light; and selecting means for selecting, in response to a state of said object, one from a mode for causing said focus detecting means to detect focus with energization of said first auxiliary light projecting means, a further mode for causing said focus detecting means to detect focus with energization of said second auxiliary light projecting means and a still further mode for causing said focus detecting means to detect focus without energization of any auxiliary light projecting means.

12. An auxiliary light projecting apparatus for use with a focus detecting device of a camera for carrying out focus detecting with respect to a photographic object based on light impinging on a focus detecting region, said auxiliary light projecting apparatus comprising:
  light projecting means for projecting a light covering a region corresponding to an entirety or part of said focus detecting region; and
  control means for selectively driving, in response to a state of said object, said light projecting means whether covering a region corresponding to the entirety of said focus detecting region or a region corresponding to a part of said focus detecting region.

13. An auxiliary light projecting apparatus for use with a focus detecting device of a camera for carrying out focus detection with respect to a photographic object based on light impinging on a focus detecting region, said auxiliary light projecting apparatus comprising:
  first light projecting means for projecting light to illuminate a region corresponding to an entirety of said focus detecting region;
  second light projecting means for projecting condensed light to illuminate a region corresponding to a predetermined part of said focus detecting region; and
  control means for selectively actuating said first and second light projecting means in response to a state of said photographic object.

14. An auxiliary light projecting apparatus for use with a focus detecting device of a camera for carrying out focus detection with respect to a photographic object based on light impinging on a focus detecting region, said auxiliary light projecting apparatus comprising:
  light projecting means for projecting light to illuminate a region corresponding to an entirety or a predetermined part of said focus detecting region; and
  control means for selectively driving, in response to a state of said object, said light projecting means whether to illuminate a region corresponding to the entirety of said focus detecting region or a region corresponding to the predetermined part of said focus detecting region.

15. An auxiliary light projecting apparatus for use with a focus detecting device of a camera for carrying out focus detection with respect to a photographic object based on light impinging on a focus detecting region, said auxiliary light projecting apparatus comprising:
  first light projecting means for projecting light to illuminate a region corresponding to an entirety of said focus detecting region;
  second light projecting means for projecting condensed light to illuminate a region corresponding to a part of said focus detecting region during one focus detection period; and
  control means for selectively actuating said first and second light projecting means in response to the state of said photograhic object, the state representing the state of the object before the light projection.

16. An auxiliary light projecting apparatus for use with a focus detecting device of a camera for carrying out focus detection with respect to a photographic object based on light impinging on a focus detecting region, said auxiliary light projecting apparatus comprising:
  light projecting means for projecting light to illuminate a region corresponding to an entirety or part of said focus detecting region during one focus detection period; and
  control means for selectively driving, in response to a state of said object, said light projecting means whether to illuminate a region corresponding to the entirety of said focus detecting region or a region corresponding to a part of said focus detecting region, the state representing the state of the object before the light projection.

17. A focus detecting device as claimed in claim 11, wherein said focus detecting means includes,
  a pair of light receiving means for receiving light from the object through an object lens, and for outputting a pair of images of the object; and
  calculating means for calculating a correlation between the pair of images.

* * * * *